United States Patent
Katayama

[11] Patent Number: 6,100,947
[45] Date of Patent: Aug. 8, 2000

[54] LIQUID CRYSTAL PANEL SUBSTRATE, LIQUID CRYSTAL PANEL AND ELECTRONIC APPARATUS USING THE SAME

[75] Inventor: Shigenori Katayama, Chino, Japan

[73] Assignee: Seiko Epson Corporation, Tokyo, Japan

[21] Appl. No.: 09/090,345

[22] Filed: Jun. 4, 1998

[30] Foreign Application Priority Data

Jun. 5, 1997 [JP] Japan .................................. 9-148296
Feb. 3, 1998 [JP] Japan .................................. 10-022388

[51] Int. Cl.[7] .................................................. G02F 1/1343
[52] U.S. Cl. .................................................. 349/38; 349/39
[58] Field of Search ........................................ 349/39, 38

[56] References Cited

U.S. PATENT DOCUMENTS

| | | | |
|---|---|---|---|
| 4,239,346 | 12/1980 | Lloyd | 349/39 |
| 5,182,620 | 1/1993 | Shimada et a l. | 349/39 |
| 5,461,501 | 10/1995 | Sato et al. | 349/39 |
| 5,745,195 | 4/1998 | Zhang | 349/39 |
| 5,777,701 | 7/1998 | Zhang | 349/39 |
| 5,814,529 | 9/1998 | Zhang | 349/39 |
| 5,859,677 | 1/1999 | Watanabe et al. | 349/39 |
| 5,909,262 | 1/1999 | Tomooka et al. | 349/39 |

*Primary Examiner*—James A. Dudek
*Attorney, Agent, or Firm*—Oliff & Berridge, PLC

[57] ABSTRACT

In a conventional reflective liquid crystal panel (liquid crystal panel) using a semiconductor substrate, since storage capacitors are formed on the surface of the substrate, with a small pixel size, a sufficient storage capacitor (50 to 100 fF) cannot be ensured, and a voltage necessary for driving a liquid crystal cannot be held. The reflective electrode of each of pixels serves as a conductive layer of one of a pair of electrodes which constitute a storage capacitor, and the other conductive layer of the storage capacitor is formed below the reflective electrode through an insulation film so that the other conductive layer is fixed at the predetermined potential.

21 Claims, 17 Drawing Sheets

LIQUID CRYSTAL PANEL SUBSTRATE, LIQUID CRYSTAL PANEL AND ELECTRONIC APPARATUS USING THE SAME

BACKGROUND OF THE INVENTION

1. Field of Invention

The present invention relates to the structure of a reflective electrode-side substrate, and a liquid crystal panel containing the reflective electrode-side substrate, and also relates to an electronic apparatus using the liquid crystal panel.

2. Description of Related Art

As a small high-definition active matrix liquid crystal panel suitable for application to a light valve for a projector, and the like, a transmissive liquid crystal panel containing thin film transistors (TFT) formed on a quartz substrate by using polycrystalline and transparent electrodes formed as pixel electrodes on the transistors is conventionally brought into practical use. In the transmissive liquid crystal panel using TFT, the TFT region provided for each of pixels and the wiring region containing a gate electrode and source and drain electrodes for driving the TFT are not transmissive regions for transmitting light. Therefore, such a panel has the fatal defect that as the size of one pixel region decreases due to an increase in resolution of the panel to XGA or SXGA, the aperture ratio decreases.

Therefore, as an active matrix liquid crystal panel which can easily achieve a high aperture ratio as compared with a transmissive active matrix liquid crystal panel, a reflective active matrix liquid crystal panel is proposed which contains pixel electrodes serving as reflective electrodes, and transistors respectively formed below the pixel electrodes.

In the above-described conventional reflective active matrix liquid crystal panel, like the transistors, storage capacitors for holding the voltage applied to the reflective electrodes are also arranged in a different plane region separated from the arrangement region of the transistors below the reflective electrodes. Therefore, in the conventional reflective active matrix liquid crystal panel, the storage capacitor cannot be formed in the arrangement region of the transistor provided in each pixel, and thus the area where the storage capacitors can be arranged decreases as the pixel size (the size of the pixel region) decreases. As a result, the liquid crystal panel has the fault that a sufficient storage capacitor (30 to 100 fF or more, preferably 50 to 100 fF or more) cannot be ensured. When the storage capacitors cannot be ensured, the voltage applied to the reflective electrodes through the transistors during a selection period in which the transistors are conducted is stored in the storage capacitors, but the stored charge is discharged due to the resistance component of a liquid crystal layer and OFF leakage of the transistors during a later non-selection period. As a result, the stored voltage decreases, and thus a stable voltage cannot be continuously applied to the reflective electrodes over the whole non-selection period. If a stable voltage cannot be applied to the reflective electrodes during one vertical scanning (field or frame) period, gray shades cannot be sufficiently obtained, contrast deteriorates, and display quality also deteriorates.

FIG. 2(A) is a sectional view showing the one-pixel portion of the pixel region formed on a reflective electrode-side substrate of a conventional reflective liquid crystal panel containing a semiconductor substrate. FIG. 2(A) is a sectional view taken along broken line A-A' in FIG. 2(B) which is a plan view showing the one pixel portion in the pixel region formed on the reflective electrode-side substrate. In FIG. 2(A), reference numeral 201 denotes a semiconductor substrate, and reference numeral 202 denotes a well region. Reference numeral 203 denotes a field oxide film. Reference numeral 204a denotes a gate insulation film of insulation film layer 204, and reference numeral 204b denotes an insulation film of insulation film layer 204 serving as a dielectric film which constitutes a storage capacitor. Reference numeral 205a denotes a gate electrode to which a scanning signal is applied and reference numeral 205b denotes a polycrystalline or metal silicide layer portion which constitutes a capacitor electrode and is of the same layer as the gate electrode 205a. Reference numerals 206a and 206b denote source and drain regions, respectively, and reference numeral 206c denotes a P-type impurity doped region. Reference numerals 207a and 207b denote first conductive layer portions serving as source and drain electrodes, respectively. Reference numeral 213 denotes a first interlayer insulation film such as a BPSG (Boron Phosphorus Silica Glass) film. Reference numeral 208 denotes a second interlayer insulation film of $SiO_2$. Reference numeral 209 denotes a second conductive layer. Reference numeral 210 denotes a third interlayer insulation film of $SiO_2$. Reference numeral 212 denotes a third conductive layer serving as a reflective pixel electrode. Reference numeral 211 denotes a connecting plug for connecting the drain electrode 207b to the pixel electrode 212.

As shown in FIG. 2(A), in the structure of a conventional storage capacitor, the P-type impurity doped region 206c is formed in the region where the field oxide film 203 is not formed on the surface of the substrate, and the capacitor electrode 205b made of polycrystalline or metal silicide is formed on the surface of the P-type impurity doped region 206c through the insulation film 204b. The storage capacitor is formed by the capacitor electrode 205b, the P-type impurity doped region 206c and the insulation film 204b interposed between both regions.

FIG. 2(B) is a plan view showing the one-pixel region of the reflective electrode-side substrate of a conventional reflective liquid crystal panel. In FIG. 2(B), reference numerals denote the same as in FIG. 2(A). The gate electrode 205a is extended in the row direction (scanning direction) of the pixels to form a scanning line for transmitting a scanning signal to the gate electrode of the transistor of the each of the pixels in the scanning direction, and the capacitor electrode 205b in the same layer as the gate electrode 205a is connected to the drain region 206b of the transistor through the drain electrode 207b. The source electrode 207a is extended in the column direction of the pixels to form a data line for successively supplying a data signal to the sources of the transistors of the respective pixels in the column direction. Each of the transistors contains the source region 206a connected to the source electrode (data line) 207a, the drain region 206b, a channel region formed between the source and drain regions on the surface of the substrate, the gate insulation film 204a, and the gate electrode 205a. The drain electrode 207b is connected to the pixel electrode 212 (not shown in FIG. 2(B)) through the connecting plug 211 at an intermediate position of wiring. The insulation film 204b is arranged directly below the capacitor electrode 205b, and the P-type impurity-doped region 206b is formed on the surface of the substrate below the insulation film 204b. The storage capacitor is formed by these films. Therefore, the storage capacitor is capable of storing the voltage of the data signal applied through the transistor in the region shown in FIG. 2(A).

However, as shown in FIG. 2(B), in a conventional example, since the gate electrode 205a and the electrode 205b above the storage capacitor consist of the same layer, both electrodes must be separated in a plane. Namely, since the storage capacitor cannot be formed in the region of each pixel where the transistor is formed, a sufficient storage capacitor value cannot be ensured.

SUMMARY OF THE INVENTION

An object of the present invention is to provide a technique capable of obtaining a sufficient storage capacitor in a reflective active matrix liquid crystal panel even if the pixel size is small.

In accordance with a first aspect of the present invention, there is provided a liquid crystal panel substrate containing reflective electrodes formed in a matrix on a substrate, transistors respectively formed in correspondence with the reflective electrodes to apply a voltage to the reflective electrodes through the transistors, and storage capacitors electrically connected to the reflective electrodes for each of the pixels, for storing charge. The transistors are respectively formed below the reflective electrodes, an intermediate conductive layer is formed between the source or drain electrodes of the transistors and the reflective electrodes, and each of the storage capacitor contains, as a pair of electrodes, the corresponding reflective electrode and the intermediate conductive layer arranged below the reflective electrodes through an insulation film. A predetermined potential is applied to the intermediate conductive layer.

In the above configuration, each of the storage capacitors can be provided in a wide area in each pixel region excluding the connection position between the reflective electrode and the source or drain electrode, and a sufficient storage capacitor value can thus be ensured for each of the pixels. Namely, since an area close to the pixel region can be used for the storage capacitors and a large storage capacitor can be obtained, a voltage can stably be applied to the reflective electrodes.

In accordance with a second aspect, the invention relates to the liquid crystal panel substrate described above, wherein to the intermediate conductive layer is electrically connected to a wiring layer for applying the potential of the common electrode arranged opposite to the reflective electrodes with a liquid crystal held therebetween or a value close to it, the potential at the center of the amplitude of the voltage to be applied to the reflective electrodes or a potential close to it, or the intermediate potential between the above two potentials. To the other electrode of a pair of electrodes which constitute each of the storage capacitors a voltage is applied as a reference voltage for storing charge in the liquid crystal panel. In other words, since the voltage supplied to a driving circuit or the like arranged on the reflective electrode-side substrate is used as the reference voltage for the storage capacitors, a voltage for the exclusive use need not be supplied from the outside.

In accordance with a third aspect, the present invention relates to the liquid crystal panel substrate described above, wherein the intermediate conductive layer is a metal layer continuously arranged below the reflective electrodes and below the spaces between the adjacent reflective electrodes. The intermediate conductive layer functions as a light shielding layer for blocking off the light incident through the spaces between the adjacent reflective electrodes. If the incident light enters a semiconductor layer which constitutes the transistors, photo-current flows, and thus light leakage occurs even in an off state of the transistors. However, the incident light can be cut off by the intermediate conductive layer.

In accordance with a fourth aspect, the invention relates to the liquid crystal panel substrate described above, wherein the intermediate conductive layer is connected to a wiring layer for supplying the predetermined potential in the peripheral region of the pixel region on the liquid crystal panel substrate to be used as another electrode common to the pixels, which constitutes each of the storage capacitors. The intermediate conductive layer can be a conductive layer common to the storage capacitors of the respective pixels. Therefore, the area of the conductive layer can sufficiently be ensured, thereby the wiring capacitance is increased. Although the predetermined voltage applied to the intermediate conductive layer easily varies due to the effect of variations in the storage capacitors of the pixels, in the present invention, the potential is stabilized due to the large wiring capacitance.

In accordance with a fifth aspect, the invention relates to the liquid crystal panel substrate described above, wherein the surface of the intermediate conductive layer is flattened, and the insulation film is formed on the flattened surface. In order to provide uniform distances between the pairs of the electrodes of the respective storage capacitors, the surface of the intermediate conductive layer serving as the lower electrode is flattened, the insulation film as a dielectric film is formed on the flattened surface, and the reflective electrodes are formed on the insulation film. This provides uniform charge storage in the storage capacitors and uniform voltage application to the reflective electrodes. Since the reflective electrodes are formed on the flattened intermediate conductive layer, the reflective electrodes are also flattened, thereby improving reflectance.

In accordance with a sixth aspect, the invention relates to the liquid crystal panel substrate described above, wherein the source or drain electrode of each of the transistors is electrically connected directly to the corresponding reflective electrode. In this case, since continuous contact holes are formed in the insulation films above and below the intermediate layer, the insulation films in the upper and lower layers are preferably made of the same material. If the connecting contact holes are formed in different insulation films by etching with the same etching gas or etchant, side etching occurs in one of the insulation films due to a difference between the etching rates of the insulation films, thereby forming an eaves-like shape by processing. However, the use of the same insulation film has the effect of obtaining a good shape by etching.

In accordance with a seventh aspect, the invention relates to the liquid crystal panel substrate described above, wherein the source or drain electrode of each of the transistors is electrically connected directly to the corresponding reflective electrode through a connector formed in the same layer as the intermediate conductive layer but electrically insulated. Therefore, openings are formed at the connecting positions in the intermediate conductive layer, and the storage capacitors are not formed at the connecting positions. Particularly, since the reflective electrodes are respectively electrically connected to the source or drain electrodes through the connecting parts consisting of the same layer as the intermediate conductive layer, when the insulation films in the upper and lower layers of the intermediate conductive layer consist of different films of SiN and $SiO_2$ or $TaO_x$ and $SiO_2$, for example, etching of the connecting contact holes for the source and drain electrodes and the reflective electrodes with the same etching gas or etchant causes side etching in one of the insulation films due to a difference between the etching rates of the insulation films, thereby causing an eaves-like shape by processing. In the construction of the present invention, etching can be carried out with an etching gas or etchant suitable for each of the insulation films, and thus side etching can be prevented, thereby causing the effect of obtaining a good shape by etching.

In accordance with the eighth element, the invention relates to the liquid crystal panel substrate described above, wherein the insulation film interposed between a pair of electrodes of each of the storage capacitors is made of silicon dioxide. Since silicon dioxide has good adhesion, cracks hardly occur in junctions to the reflective electrodes in the upper layer.

In accordance with a ninth aspect, the invention relates to the liquid crystal panel substrate described above, wherein the thickness of the insulation film is 6500 Å or less. When the insulation film is made of silicon dioxide, in order to obtain a minimum storage capacitor value of 30 fF or more, which permits stable application of a voltage to the reflective electrodes, a thickness of 6500 Å or less is required.

In accordance with a tenth aspect, the invention relates to the liquid crystal panel substrate described above, wherein the insulation film interposed between a pair of electrodes of each of the storage capacitors is made of a material having a higher dielectric constant than silicon dioxide. A material having high dielectric constant other than silicon dioxide can be used as a dielectric film for the storage capacitors.

In accordance with an eleventh element, the invention relates to the liquid crystal panel substrate described above, wherein the insulation film is made of silicon nitride. Silicon nitride has a dielectric constant ($\epsilon=6.5$) higher than silicon dioxide ($\epsilon=3.9$). Since silicon nitride has a higher dielectric constant than silicon dioxide, the capacitor value can be ensured even if the area of the storage capacitors is small. Even if the pixel size is decreased due to an increase in definition of a liquid crystal panel, the storage capacitors can easily be obtained.

In accordance with a twelfth element, the invention relates to the liquid crystal panel substrate described above, wherein the thickness of the insulation film is 10800 Å or less. Since the dielectric constant of silicon nitride is higher than that of silicon dioxide, the thickness of the insulation film as the dielectric film can be increased. With a small thickness, production is difficult, while with a large thickness, the insulation film can easily be formed by the CVD method or the like.

In accordance with a thirteenth element, the invention relates to the liquid crystal panel substrate described above, wherein the insulation film is made of tantalum oxide. Tantalum oxide has a dielectric constant ($\epsilon=27.6$) higher than silicon dioxide ($\epsilon=3.9$). Since tantalum oxide has a higher dielectric constant than silicon dioxide and silicon nitride, the capacitor value can be ensured even if the area of the storage capacitors is small. Even if the pixel size is decreased due to an increase in definition of a liquid crystal panel, and even if the insulation film is thin, the storage capacitors can easily be obtained.

In accordance with a fourteenth aspect, the invention relates to the liquid crystal panel substrate described above, wherein the thickness of the insulation film is 46000 Å or less. Since the dielectric constant of tantalum oxide is higher than that of silicon dioxide and silicon nitride, the thickness of the insulation film as the dielectric film can be increased. With a small thickness, production is difficult, while with a large thickness, the insulation film can easily be formed by anodic oxidation of the intermediate conductive layer or the like.

In accordance with the fifteenth aspect, the invention relates to the liquid crystal panel substrate described above, wherein the intermediate conductive layer is made of tantalum, and the insulation film is formed by anodic oxidation of tantalum. The intermediate conductive layer can be made of tantalum having low resistivity. The potential of the other electrodes of the storage capacitors can easily be made uniform in the pixel region. The insulation film is formed by oxidation of the surface of the intermediate conductive layer to improve adhesion of the insulation film.

In accordance with a sixteenth aspect, the invention provides a liquid crystal panel containing the liquid crystal panel substrate described above, a transparent substrate disposed opposite to the liquid crystal panel substrate with a space in-between, and a liquid crystal held in the space between the liquid crystal panel substrate and the transparent substrate. Since a sufficient storage capacitor can be ensured in each of the pixels, even if the size of each of the pixels is decreased due to an increase in definition of the liquid crystal panel, the voltage applied to each of the pixels during the selection period of time is stored by the storage capacitor during the non-selection period, thereby permitting stable application of a voltage during the period of one vertical scanning (frame or field).

In accordance with the seventeenth aspect, the invention provides an electronic apparatus containing the liquid crystal panel described above. Particularly, in a portable electronic apparatus (a computer, a portable telephone, a liquid crystal television, an electronic watch, a portable terminal device, or the like) containing the reflective liquid crystal panel as a display device and a built-in battery for supplying electric power, the display device exhibits small power consumption, and thus the life of the battery can be increased. In a projective display device containing the reflective liquid crystal panel serving as a light valve, even if the definition of the liquid crystal panel is increased, high image quality can be obtained.

DETAILED DESCRIPTION OF PREFERRED EMBODIMENTS

Preferred embodiments of the present invention will be described below with reference to the drawings.

Figure 1A:
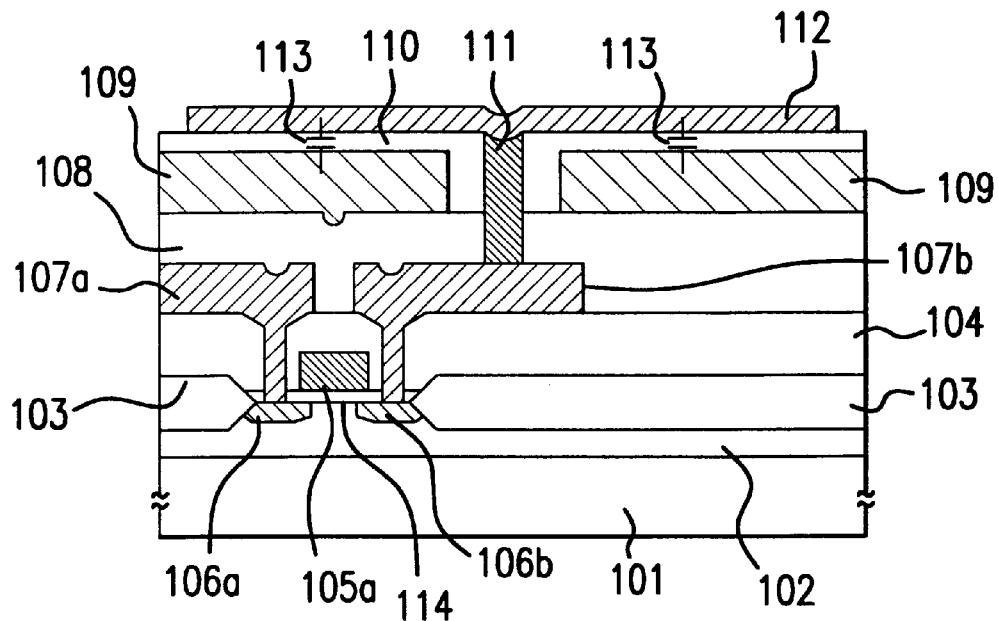
FIG. 1(A) is a sectional view showing the pixel region of a reflective electrode-side substrate of a reflective liquid crystal panel in accordance with a first embodiment of the present invention.
Figure 3:
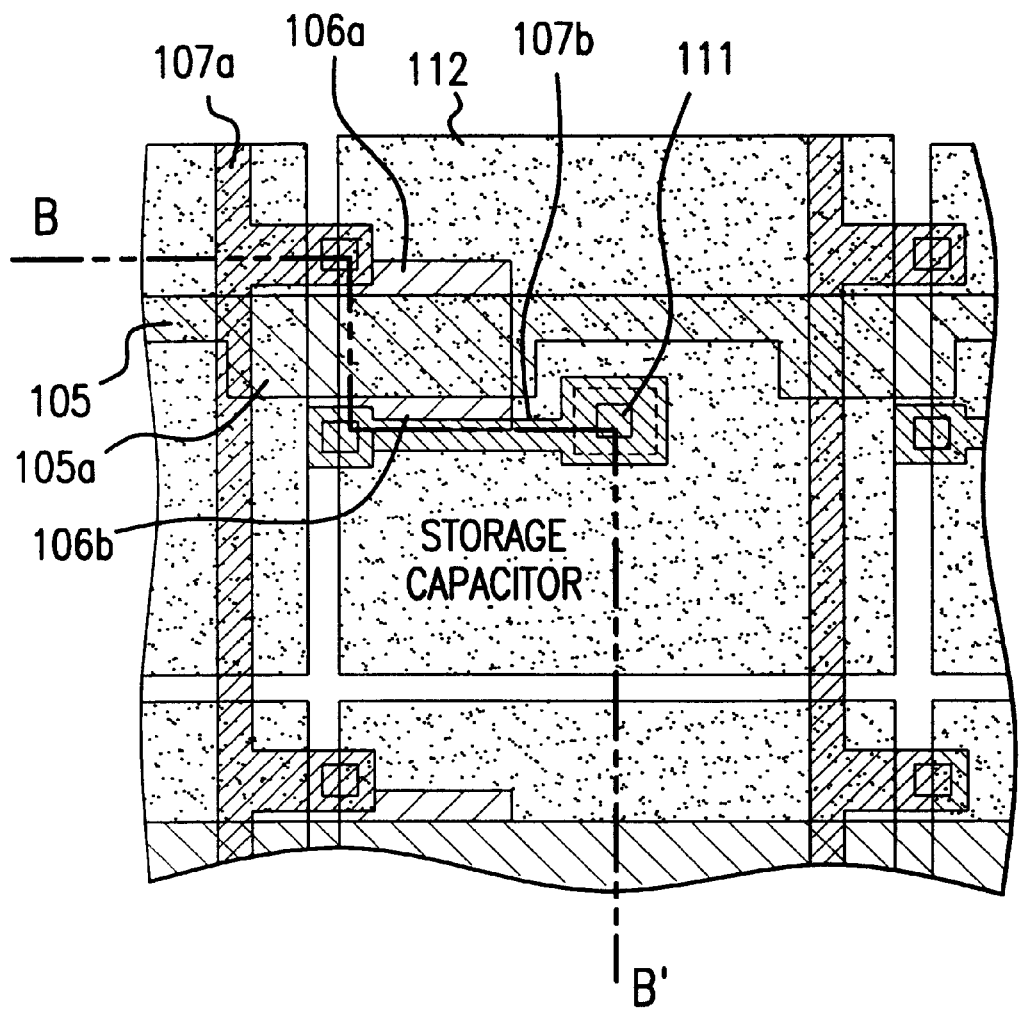
FIG. 3 is a plan view showing the pixel region of a reflective electrode-side substrate of a reflective liquid crystal panel in accordance with a first embodiment of the present invention.
Figure 15A:
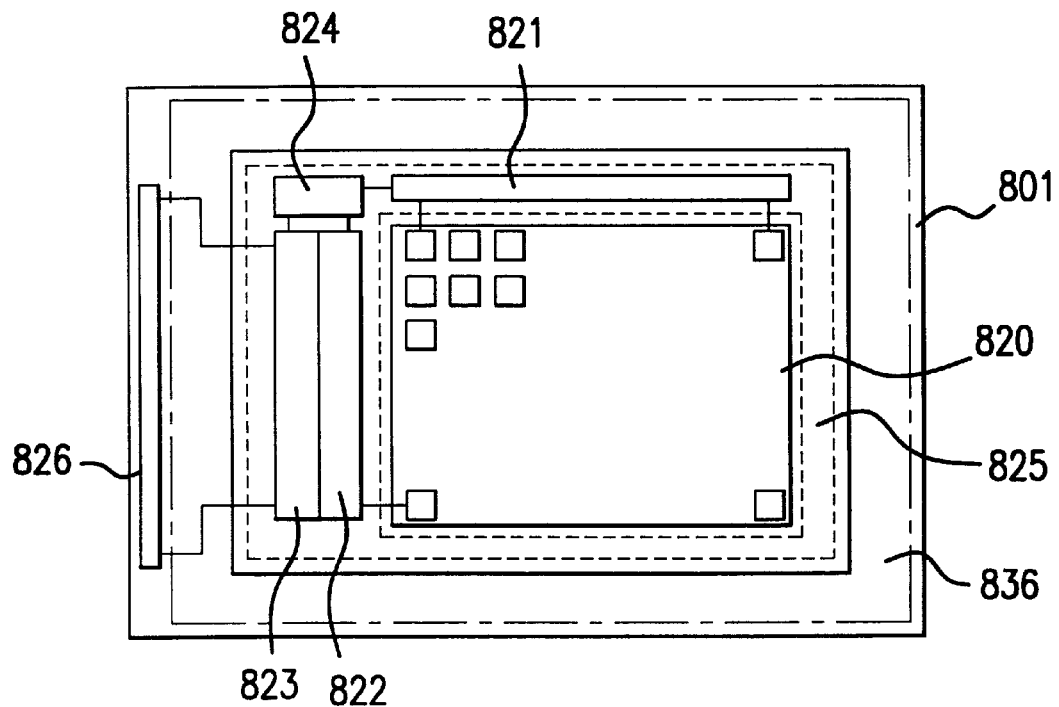
FIG. 15(A) is a plan view showing an example of the layout construction of a reflective electrode-side substrate of a reflective liquid crystal panel in accordance with an embodiment of the present invention.

FIGS. 1(A) and 3 are a sectional view and a plan view, respectively, illustrating the construction of one pixel portion in the pixel region of the reflective electrode-side substrate of a reflective liquid crystal panel in accordance with a first embodiment of the present invention. FIGS. 15(A) and (B) are a plan view and a sectional view, respectively, of a reflective liquid crystal panel of the present invention.

In the present invention, as shown in FIG. 1(A), a semiconductor substrate 101 is used as a reflective electrode-side substrate. The whole construction of the reflective liquid crystal panel is outlined as follows.

Figure 15B:
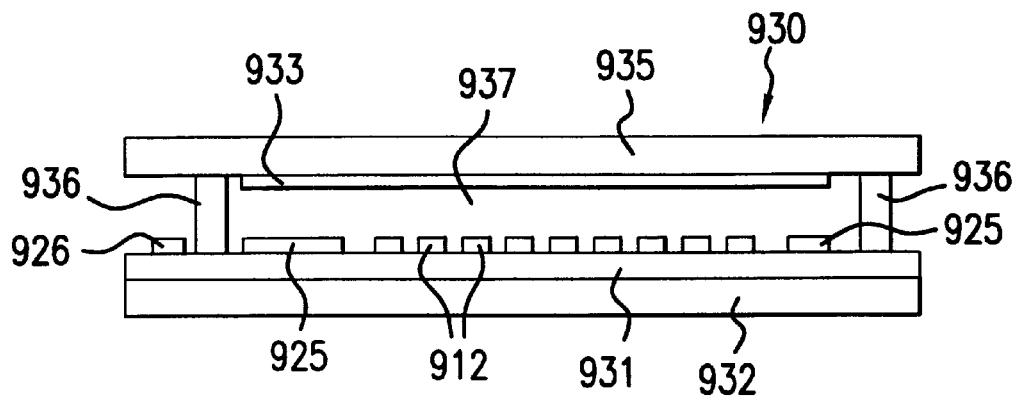
FIG. 15(B) is a sectional view showing an example of a reflective liquid crystal panel containing a liquid crystal panel substrate in accordance with an embodiment of the present invention.

As shown in FIGS. 15(A) and (B), in the central portion of a reflective electrode-side substrate 801 (denoted by reference numeral 931 in FIG. 15(B)) is provided a pixel region 820 in which scanning lines and data lines are arranged in a matrix. Pixels are respectively provided in correspondence with the intersections of the scanning lines and the data lines, and a reflective electrode 912 and a switching element are provided on each of the pixels, as described below.

Arranged in the periphery of the pixel region 820 are circuits such as a scanning line driving circuit 822 for supplying scanning signals to the scanning lines, a data line driving circuit 821 for supplying data signals to the data lines, an input circuit 823 to which image data is input from the outside through a pad region 826 (denoted by reference numeral 926 in FIG. 15(B)), a timing control circuit 824 for controlling these circuits, etc. The liquid crystal panel contains the reflective electrode-side substrate 801 or 931 and the opposite substrate 935 made of transparent glass and having a common electrode 933 formed on the inner side. Both substrates are fixed by adhering with a sealing material 936 in the region (the region surrounded by a solid line and a one-dot chain line) 836, with a liquid crystal 937 sealed in the space therebetween. The region 825 (denoted by reference numeral 925 in FIG. 15(B)) surrounded by a dotted line corresponds to a light shielding film for shielding the periphery of the pixel region.

The sectional structure of the reflective electrode-side substrate (801, 931) is described in detail with reference to FIG. 1(A). In FIG. 1(A), reference numeral 101 denotes a P-type semiconductor substrate (which may be an N-type semiconductor substrate) made of single crystal silicon, and reference numeral 102 denotes a P-type well region formed on the surface of the semiconductor substrate 101 and having a higher impurity concentration than the substrate. It is to be understood that the well region 102 is not limited. For example, in a high-definition liquid crystal panel having pixels of 768×1024, the well region of the pixels may be formed as a common well region separately from the well region in the portion of the liquid crystal panel shown in a plan view of FIG. 15(A), in which elements which constitute circuits such as the data line driving circuit 821, the scanning line driving circuit 822, the input circuit 823, the timing control circuit 824, etc. are formed.

Reference numeral 103 denotes a field oxide film (so-called LOCOS) formed on the surface of the semiconductor substrate 101, for separating devices. The field oxide film 103 is formed by selective thermal oxidation. Formed in the field oxide film 103 is an opening in which a gate electrode 105a and a scanning line (denoted by reference numeral 105 in FIG. 1(B)) made of polycrystalline or metal silicide are formed at the center through a gate oxide film 114 formed by thermal oxidation of the surface of the silicon substrate. On the surface of the substrate, on both sides of the gate electrode 105a, are source and drain regions 106a and 106b containing an N-type impurity layer (referred to as a "doped layer" hereinafter) having a higher impurity concentration than the well region 102 to form a field effect transistor (referred to as "FET" hereinafter). Formed on the source and drain regions 106a and 106b are first conductive layer portions 107a and 107b of a first aluminum layer, respectively, with a first interlayer insulation film 104 such as a BPSG (Boron Phosphorus Silica Glass) film in between. The first conductive layer portion 107a is electrically connected to the source region 106a through a contact hole formed in the insulation film 104 to form a source electrode (corresponding to a data line) for supplying the voltage of a data signal to the source region 106a. The first conductive layer portion 107b is electrically connected to the drain region 106b by a contact hole formed in the insulation film 104 to form a drain electrode.

Formed on the first conductive layer portions 107a and 107b is a second interlayer insulation film 108 containing an insulation film of silicon dioxide. Further, formed on the second interlayer insulation film 108 is a second conductive layer 109 (corresponding to the intermediate conductive layer of the present invention) containing an aluminum layer or a tantalum layer. The surface of the second conductive layer 109 is preferably flattened in order to form a storage capacitor 113 of a pixel, as described below.

Therefore, after the second interlayer insulation film 108 is formed, the surface thereof is flattened by CMP (chemical mechanical polishing) or the like, and the second conductive layer 109 is formed on the flattened surface of the second interlayer insulation film 108. As another method, after the second interlayer insulation film 108 and the second conductive layer 109 are laminated in turn, the surface of the second conductive layer 109 may be flattened by the CMP method or the like.

Formed on the second conductive layer 109 is a reflective electrode 112 as a pixel electrode through an insulation film 110, which will be described in detail below. The reflective electrode 112 is electrically connected to the drain electrode 107b through a contact hole formed in the insulation films 108 and 110. The reflective electrode 112 is made of aluminum, and its surface is flattened by the CMP method. Connection between the drain electrode 107b and the reflective electrode 112 is performed by burying, by the CVD method or the like, a connecting plug 111 in the contact hole formed in the insulation films 108 and 110.

Wiring is electrically connected to the second conductive layer 109 for supplying any one of the predetermined voltages Vref, including the common electrode potential $V_{COM}$ of the liquid crystal panel or a potential close to it, the potential at the center of the amplitude of the voltage (i.e., the data signal voltage supplied to the data line) to be applied to the reflective electrode 112 or a potential close to it, or the intermediate potential between the common electrode potential and the potential at the center of the voltage amplitude. With reference to FIG. 15(B), the common electrode potential $V_{COM}$ is the potential of the common electrode 933, which is applied to the common electrode 933 formed on the opposite substrate 935 opposed to the pixel electrode 921 with the liquid crystal 937 held in-between. $V_{COM}$ corresponds to the reversal central potential in polarity reversal driving of the liquid crystal layer of each pixel.

As the predetermined potential Vref, the voltage used in the peripheral circuits arranged on the reflective electrode-side substrate is preferably used. This eliminates the need for providing a pad for the exclusive use for applying the potential Vref to the second conductive layer 109. Wiring is connected to the second conductive layer 109 in the peripheral region of the pixel region.

Formed on the second conductive layer 109 is a third interlayer insulation film 110 made of a material such as silicon dioxide $SiO_2$ ($\epsilon$=3.9), silicon nitride SiN ($\epsilon$=6.5), or a material having a higher dielectric constant than $SiO_2$, such as tantalum oxide TaOx ($\epsilon$=27.6), followed by flattening by the CMP (chemical mechanical polishing) method. After flattening, in order to electrically connect the drain electrode 107b and the reflective electrode 112, the connecting plug 111 made of a high-melting-point metal such as tungsten or the like is buried in the contact hole of the interlayer insulation films by the CVD method. After the connecting plug 111 has been formed, the reflective electrode 112 is formed by, for example, a low-temperature sputtering process. The second conductive layer 109 and the reflective electrode 112 form a pair of electrodes with the second interlayer insulation film 110 held in-between to form the storage capacitor 113 for each of the pixels, as shown in FIG. (1A).

In the formation of the third interlayer insulation film 110 using silicon dioxide or silicon nitride, the film is deposited by the CVD process or the like and then flattened. In the use of tantalum oxide, after the second interlayer conductive film is formed using tantalum, the tantalum surface is subjected to anodic oxidation to form tantalum oxide and then flattened. If the surface of the second conductive layer 109 is flattened, and the surface of the insulation film 110 formed on the flattened surface has a degree of unevenness which can be neglected in formation of the storage capacitor, the third interlayer insulation film 110 need not be flattened.

In the above description of the manufacturing method, the surface of the second conductive layer 109 and/or the surface of the third interlayer insulation film 110 is flattened, but this is not an essential requirement for the manufacturing method. It is important for the present invention that the third interlayer insulation film 110 formed on the second conductive layer 109 has a uniform thickness, and the storage capacitor 113 can sufficiently be ensured. Therefore, even if the surface of the second conductive layer 109 has some unevenness, even in a manufacturing process in which the third interlayer insulation film 110 with a uniform thickness on the second conductive layer 109 by the CVD or anodic oxidation method is formed, a thick reflective electrode material is formed on the uneven surface of the third interlayer insulation film 110, the surface by the CMP method is polished to form the reflective electrode 112, and the storage capacitor 113 is thus formed. In this case, the lower surface of the reflective electrode 112 has an unevenness along the unevenness of the lower layer, but the upper surface thereof can be made a flattened mirror surface.

The second conductive layer 109 also has the function of light-shielding the space between the adjacent reflective electrodes 112 so as to prevent light leakage from FET which is caused by incidence of light on the semiconductor layer side of the substrate through the space between the reflective electrodes 112 arranged in a matrix. The second conductive layer 109 can also be used as a common electrode for the storage capacitors of the respective pixels over the entire pixel region. Therefore, the second conductive layer 109 is formed to substantially cover the entire pixel region with openings formed in the peripheries of the connection positions between FET and the reflective electrodes in the pixel region. Thus the second conductive layer 109 not only functions as a light shielding film for incident light over the entire pixel region, but also a large wiring capacity due to a wide wiring area. Therefore, the second conductive layer 109 has the effects of preventing variations in the predetermined potential Vref applied to the conductive layer, stabilizing the charge storage functions of the storage capacitors, etc.

In this embodiment, since the continuous contact hole is formed in the insulation films (110 and 108) in layers above and below the conductive layer 109, the insulation films in the upper and lower layers are preferably made of the same material. If the connecting contact hole is formed in different insulation films by etching with the same etching gas or etchant, side etching occurs in one of the films due to a difference in the etching rates of the insulation films, thereby causing an eaves-like shape by processing. However, in the case of the same insulation film, there is the effect of obtaining a good shape by etching.

Figure 1B:
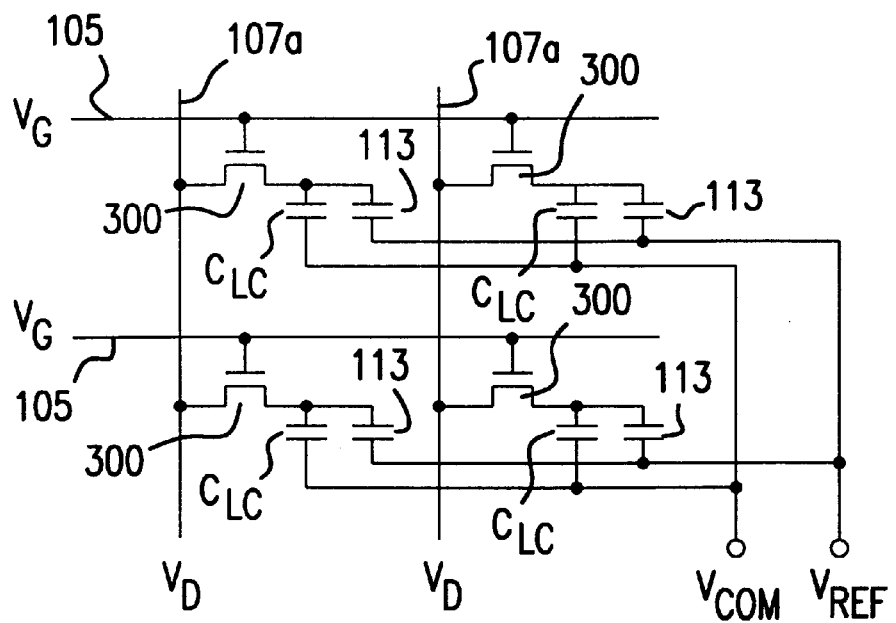
FIG. 1(B) is a block diagram of equivalent circuits of a reflective liquid crystal panel of the present invention.
Figure 12:
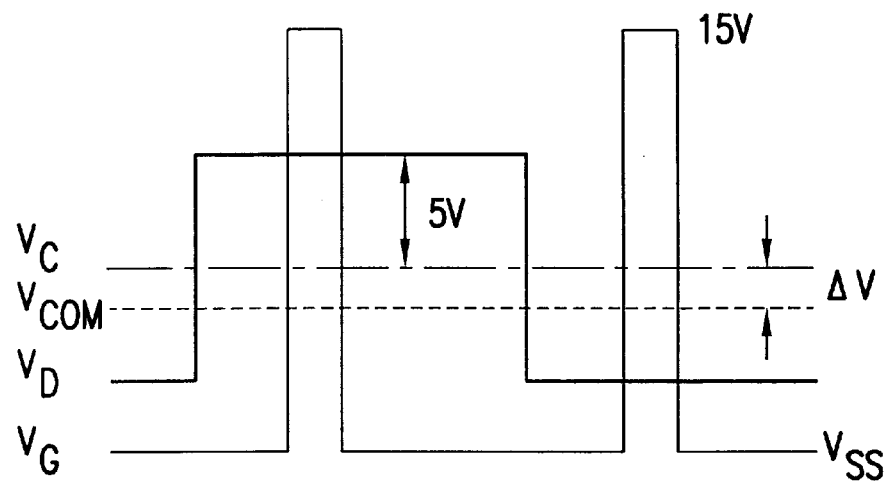
FIG. 12 is a drawing showing examples of the waveforms of the scanning signal applied to the gate electrode of FET which constitutes the switching element of each of the pixels, and the data signal applied to data lines in a reflective liquid crystal panel of the present invention.

FIG. 1(B) is a drawing showing equivalent circuits of a liquid crystal panel containing the above-described reflective electrode-side substrate. FIG. 12(A) is a drawing showing the waveforms of operations of the equivalent circuits.

The scanning lines 105 and the data lines 107a are arranged in a matrix, and each of the pixels contains an FET 300 including a gate electrode connected to the scanning line 105 and a source region connected to the data line 107a, a display element (constituting a liquid crystal capacitor $C_{LC}$) including a liquid crystal layer (937 in FIG. 15(B)) held between the reflective electrode 112 connected to the drain region of the FET 300 and the common electrode (933 in FIG. 15(B)) opposed to the reflective electrode 112, and the storage capacitor 113. As described above, the common electrode 933 which constitutes one electrode of the liquid crystal capacitor $C_{LC}$ is connected to the common electrode potential $V_{COM}$. The other electrode 109 which constitutes the storage capacitor 113 is connected to the predetermined potential Vref, as described above.

$V_G$ indicates the waveform of the scanning signal successively applied to the respective scanning lines 105, and $V_D$ indicates the voltage waveform of the data signal applied to the data lines 107a. The common electrode potential $V_{COM}$ is a voltage applied to the common electrode (933 in FIG. 15(B)) opposed to the third conductive layer 112 with the liquid crystal held therebetween, and a voltage previously shifted by ΔV from the voltage $V_C$ at the center of the amplitude of the data signal $V_D$ in consideration of push down (the phenomenon that the substantial writing voltage to the liquid crystal is shifted by a voltage ΔV to the minus side due to the influence of the gate-drain capacity of FET) which is a problem in driving the liquid crystal. The central voltage $V_C$ of the amplitude of the data signal $V_D$ is a voltage equal to one-half of the maximum amplitude of the data signal $V_D$.

During a selection period (the high-voltage period of $V_G$) in the period of one frame, the FET of a pixel is turned on, and at the same time, the data signal $V_D$ supplied to the data line 107a is supplied to the reflective electrode 112 through the FET 300. The storage capacitor 113 is present for storing charge according to a potential difference between the potential applied to the reflective electrode and the predetermined potential Vref, and holding the voltage even if the FET is turned off in a non-selection period (the low-voltage period of $V_G$) to continuously apply the stored voltage to the reflective electrode 112 as a pixel electrode.

In the storage capacitor 113, one electrode (the second conductive layer 109) is connected to the common electrode potential $V_{COM}$ to make the stored voltage the same as the voltage applied to the liquid crystal layer (937 in FIG. 15(B)) between the reflective electrode 112 and the common electrode (933 in FIG. 15(B)). In this case, since the liquid crystal capacitor $C_{LC}$ and the storage capacitor 113 are electrically connected in parallel between the reflective electrode 112 and the common electrode potential $V_{COM}$, it is possible to stabilize the voltage applied to the liquid crystal in the non-selection period in which the FET 300 is not conducted.

As described above, even if the potential applied to the second conductive layer 109 is not the common electrode potential $V_{COM}$ and is replaced by a potential close to the common electrode potential $V_{COM}$, the central potential $V_C$ of the data signal or a potential close to it, or the intermediate potential of the common electrode potential $V_{COM}$ and the central potential $V_C$ of the data signal, charge can be stored.

Next, the plane construction of the pixel region of the reflective electrode-side substrate of the liquid crystal panel shown in FIG. 1(A) is described with reference to FIG. 3.

In FIG. 3, the scanning lines 105 are extended in the row direction (scanning direction) of the pixels arranged in a matrix. On the other hand, the source electrodes (data lines) 107a are extended in the column direction of the pixels. Each of the source electrodes 107a is connected to the source 106a of the FET, and the drain electrode 107b is electrically connected to the drain 106b opposed to the source 106a with a channel held in between, and led out from the drain. The drain electrode 107b is connected to the pixel electrode 112 through the connecting plug 111. A second conductive layer (109 in FIG. 1(A)) is formed below the pixel electrode 112 through an insulation film (110 in FIG. 1(A)). The second conductive layer is continuously formed over the entire region of a plurality of pixel regions, i.e., the entire pixel region, except the periphery of the contact hole in which the connecting plug 111 of each of the pixels is formed. Therefore, the area close to the pixel electrode 112 can be used for the storage capacitor. As described above, the second conductive layer is continuously formed except the peripheries of the contact holes, the second conductive layer functions as a light shielding layer for the space between the respective reflective electrodes.

As shown in FIG. 3, in the storage capacitor portion, almost all area of the reflective electrode can be used as an electrode which constitutes each of the storage capacitors (113 in FIG. 1(A)) except the connection portion between the reflective electrode 112 and the drain electrode 107b.

Although, in the above description, the source region and source electrode are denoted by reference numeral 106a and 107a, respectively, and the drain region and drain electrode are denoted by reference numerals 106b an 107b, respectively, the source and drain may be exchanged, and the drain region and drain electrode can be denoted by reference numerals 106a and 107a, respectively, and the source region and source electrode can be denoted by reference numerals 106b and 107b, respectively.

(Description of the thickness of the insulation film serving as the dielectric film for the storage capacitors)

Next, the material and thickness of the insulation film used for the storage capacitors will be described with reference to plots of FIGS. 4 to 8 each showing changes in the storage capacitor value corresponding to the pixel size.

Figure 2A:
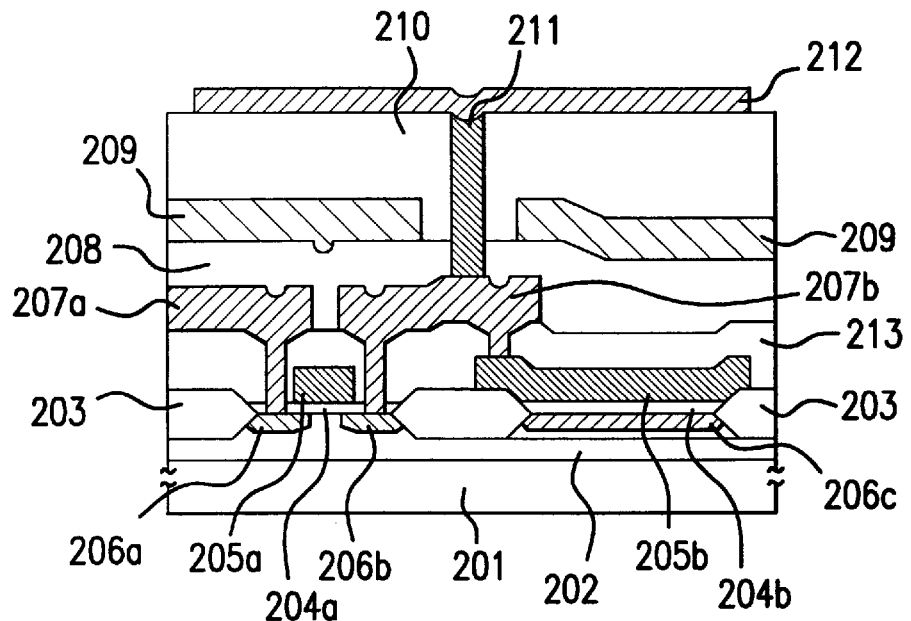
FIG. 2(A) is a sectional view showing the pixel region of a reflective electrode-side substrate of a conventional reflective liquid crystal panel.
Figure 2B:
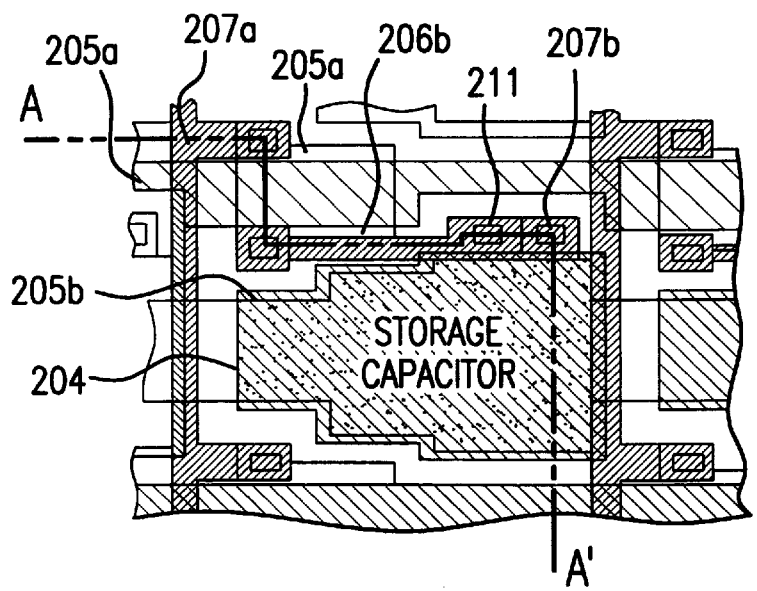
FIG. 2(B) is a plan view showing the pixel region of a reflective electrode-side substrate of a conventional reflective liquid crystal panel.
Figure 4:
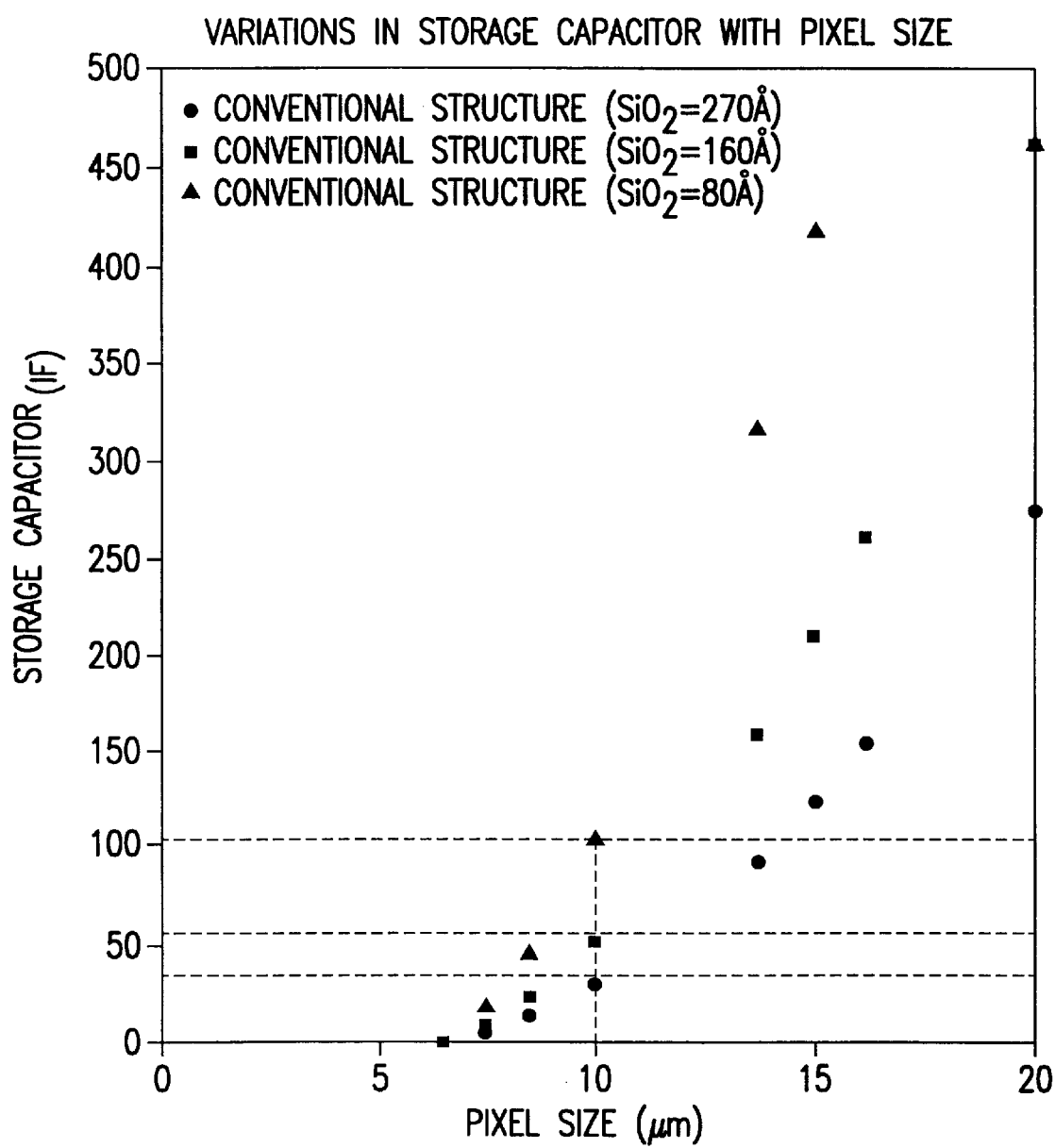
FIG. 4 is a plot showing variations in storage capacitor with the pixel size of a conventional reflective liquid crystal panel.
Figure 5:
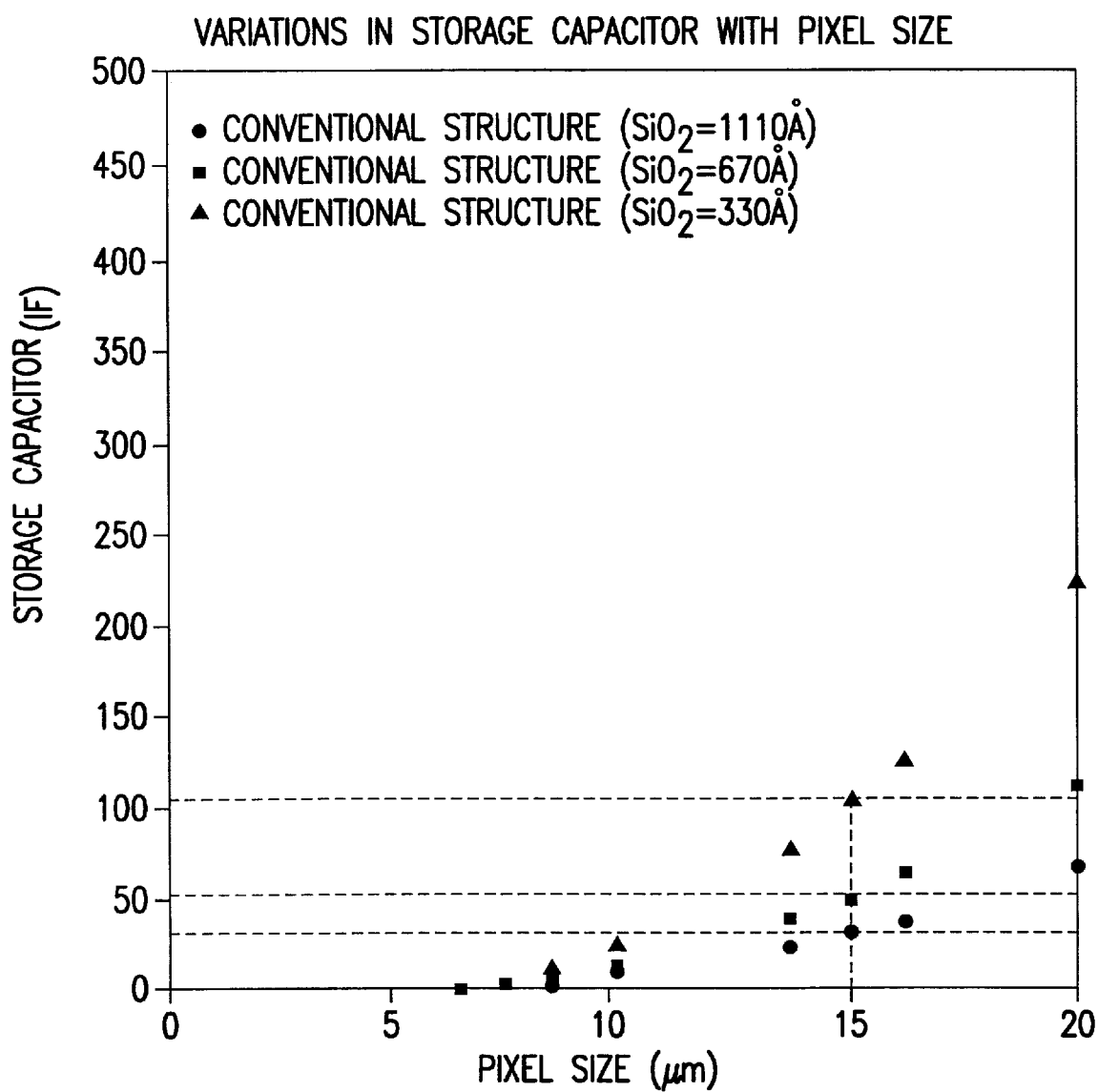
FIG. 5 is a plot showing variations in storage capacitor with the pixel size of a conventional reflective liquid crystal panel.

FIGS. 4 and 5 are plots of the conventional structure shown in FIG. 2 in which the insulation film constituting the storage capacitors was made of $SiO_2$ (ε=3.9). In FIGS. 4 and 5 which are plots of the conventional structure, the storage capacitor value was calculated on the assumption that the gate insulation film 204a constituting the storage capacitors was made of $SiO_2$ (ε=3.9), and the FET size and wiring rule were constant even if the pixel size changed.

Figure 6:
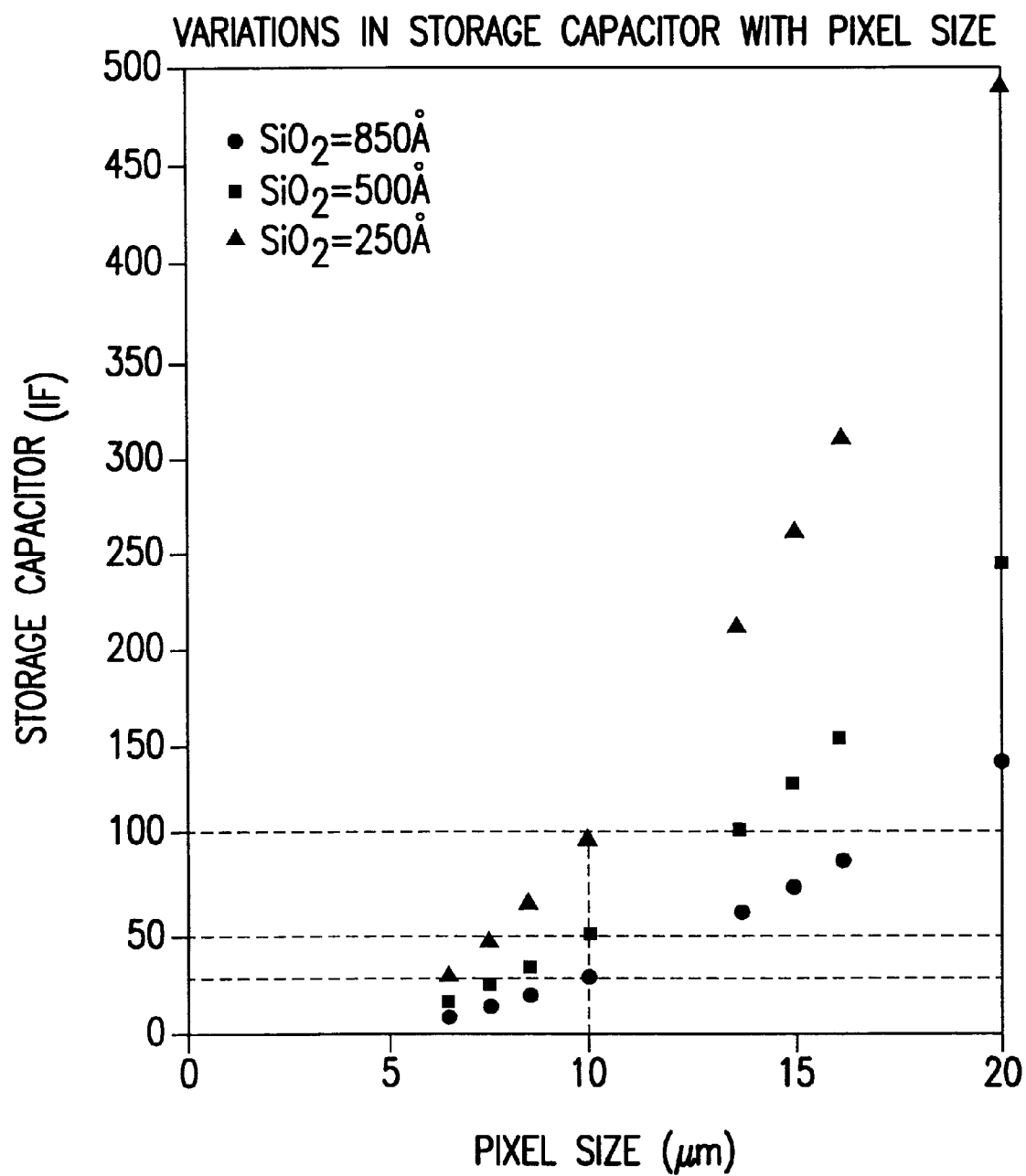
FIG. 6 is a plot showing variations in storage capacitor with the pixel size of a reflective liquid crystal panel of the present invention in which the insulation film of the storage capacitor is made of $SiO_2$ ($\epsilon=3.9$)
Figure 7:
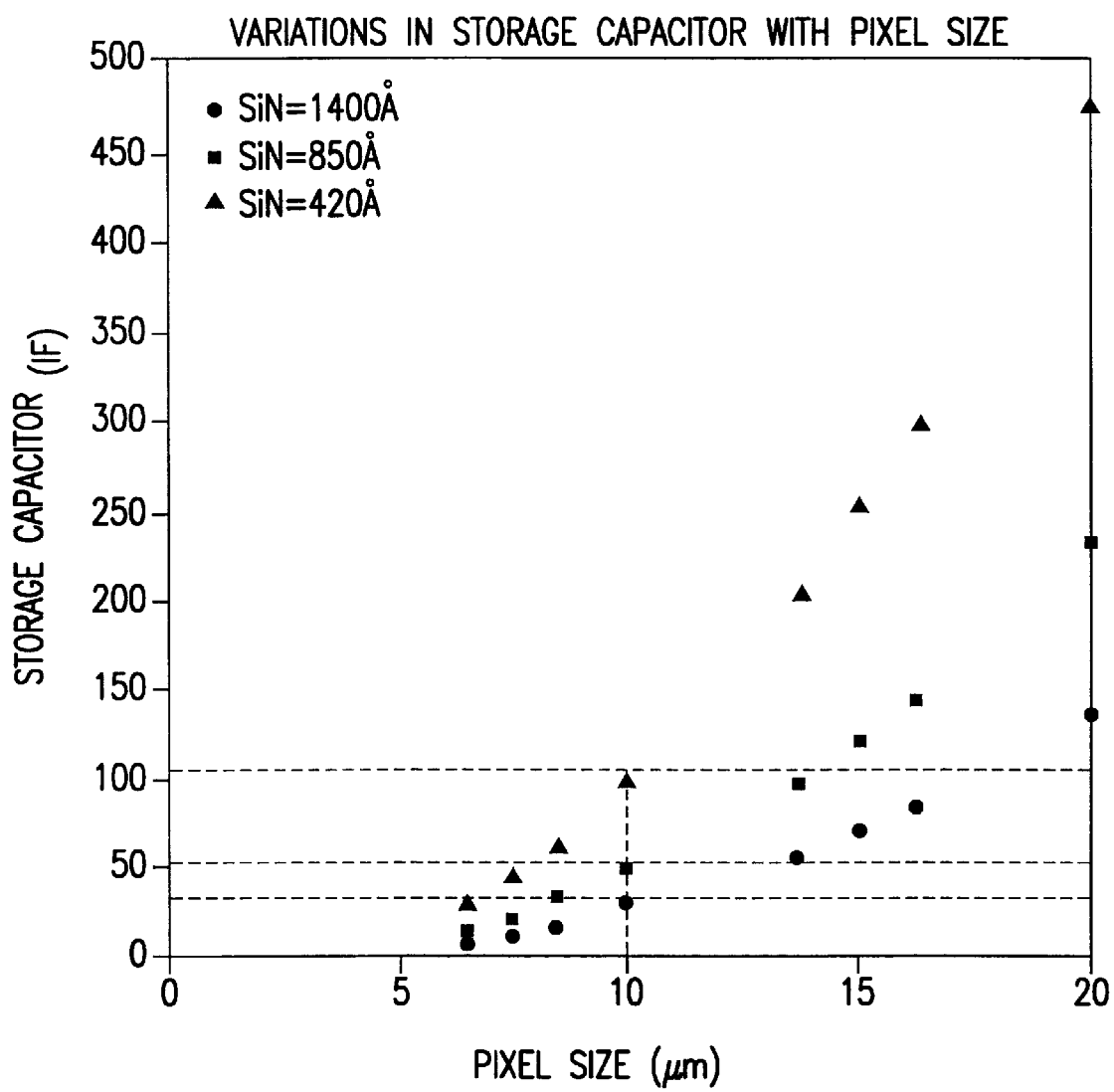
FIG. 7 is a plot showing variations in storage capacitor with the pixel size of a reflective liquid crystal panel of the present invention in which the insulation film of the storage capacitor is made of SiN ($\epsilon=6.5$)
Figure 8:
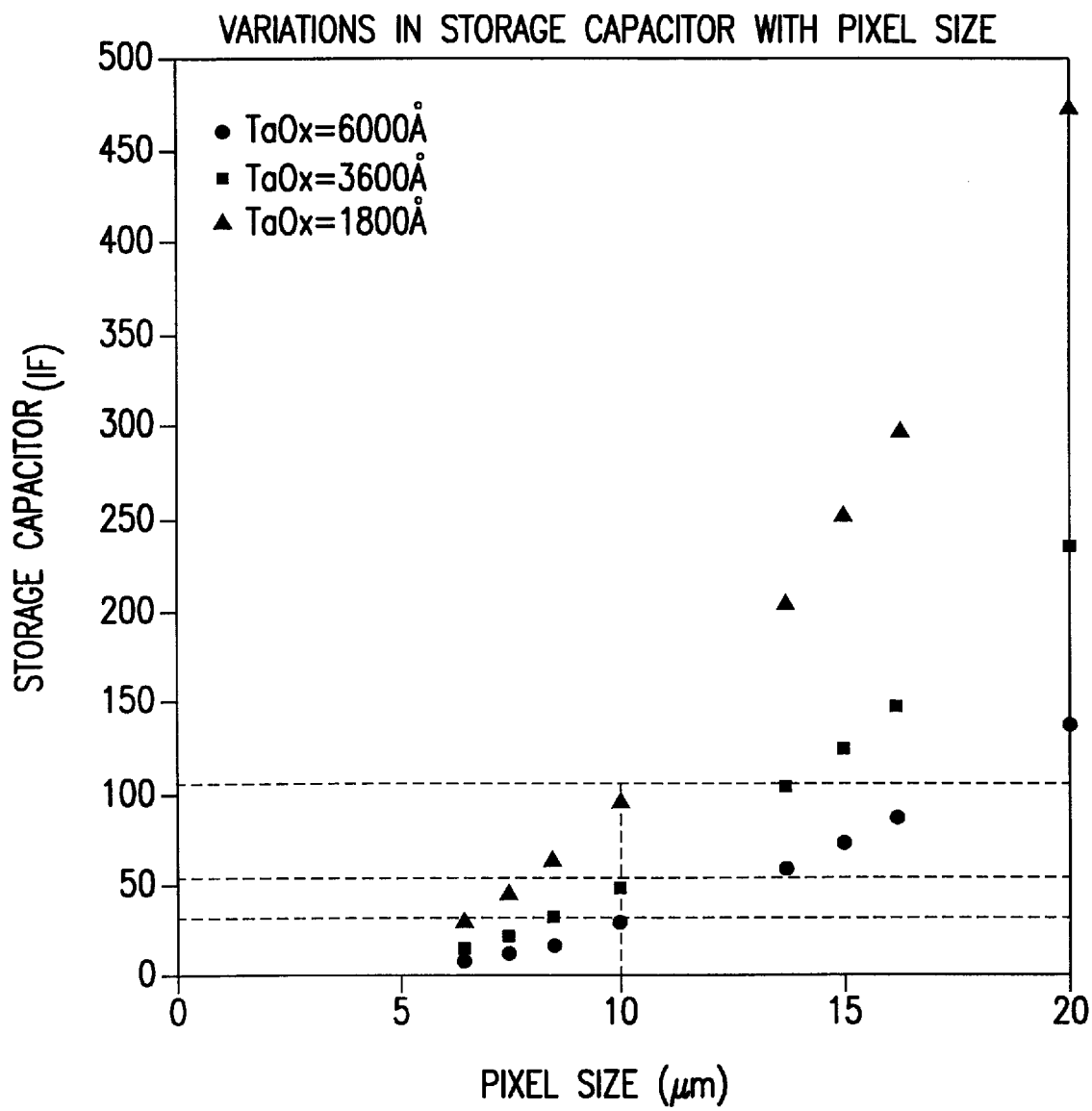
FIG. 8 is a plot showing variations in storage capacitor with the pixel size of a reflective liquid crystal panel of the present invention, in which the insulation film of the storage capacitor is made of TaOx ($\epsilon$=27.6)

On the other hand, FIGS. 6 to 8 are plots of storage capacitors in a structure in accordance with the present invention in which the insulation film constituting the storage capacitors 113 in FIG. 1(A) was made of silicon dioxide $SiO_2$ (ε=3.9), silicon nitride SiN (ε=6.5), or tantalum oxide TaOx (ε=27.6). According to the structure of the present invention, as shown in FIGS. 1(A), 1(B) and 3, in the region where each of the reflective electrodes 112 and the second conductive layer 109 overlap, a region excluding the portion (the opening region of the second conductive layer 109 around the connecting plug 111) of connection to the drain electrode 107b is used for a pair of electrodes of each of the storage capacitors 113. In FIGS. 6 to 8, the storage capacitor value was calculated on the assumption that the insulation film 112 constituting the storage capacitors 113 was made of $SiO_2$ ($\epsilon$=3.9), SiN ($\epsilon$=6.5), and TaOx ($\epsilon$=27.6), respectively, and the FET size and wiring rule were constant even if the pixel size changed.

FIGS. 4, 6, 7 and 8 are plots of the storage capacitor values obtained by calculating the thicknesses of the respective insulation films 110 of $SiO_2$, SiN and TaOx necessary for obtaining a storage capacitor of each of 30 fF, 50 fF and 100 fF when the pixel size (the length of one side on the assumption that the pixel region had a square shape) was 10 $\mu$m, and changing the pixel size for each of the obtained thicknesses (so as to change the electrode area of the storage capacitor). Similarly, FIG. 5 is a plot of the storage capacitor values obtained by calculating the thickness of the respective insulation film 110 of $SiO_2$, SiN and TaOx necessary for obtaining a storage capacitor of each of 30 fF, 50 fF and 100 fF when the pixel size was 15 $\mu$m, and changing the pixel size for each of the obtained thicknesses (so as to change the electrode area of the storage capacitor).

Although the pixel size is preferably described on the basis of the area of the reflective electrode of each pixel, the pixel size represents the pixel pitch when the area of one pixel in the pixel region is defined as a square shape for convenience. Namely, in the present invention, the pixel size represents the length and width of a one-pixel region. In the present invention, since most of a one-pixel region can be used for the reflective electrode except the margin in the boundary between the adjacent pixels, and most of the reflective electrode can be used as an electrode of the storage capacitor, the pixel pitch can be used as the pixel size. When the pixel size is considered as the pixel area, the second power of the pixel size may be obtained as the pixel area, as described below. Namely, the pixel area with a pixel size of 10 $\mu$m may be considered as 100 $\mu m^2$, the pixel area with a pixel size of 15 $\mu$m may be considered as 225 $\mu m^2$, the pixel area with a pixel size of 20 $\mu$m may be considered as 400 $\mu m^2$, and the pixel area with a pixel size of 25 $\mu$m may be considered as 625 $\mu m^2$.

The storage capacitor has the function to store the voltage applied to the pixel electrode during the non-selection period in which the FET is not conducted, as described above. Therefore, in order to decrease variation in the value of the stored voltage even if charge is discharged during the non-selection period due to off leakage of the FET, current leakage of the liquid crystal layer or the like, a capacitor value of at least about 30 fF is required regardless of the pixel size.

As shown in FIG. 4, in the conventional structure with a pixel size of 10 $\mu$m, the thickness of $SiO_2$ (the same layer as the gate insulation film as shown in FIG. 2) must be 80 to 270 Å in order to form a storage capacitor of 30 to 100 fF. As shown in FIG. 5, with a pixel size of 15 $\mu$m, the thickness of $SiO_2$ (the gate insulation film) must be 330 to 1110 Å in order to form a storage capacitor of 30 to 100 fF. Namely, in the structure of a conventional storage capacitor, a very thin $SiO_2$ layer must be formed, and thus production is difficult.

On the other hand, in the present invention, as shown in FIGS. 6 to 8, in order to form a storage capacitor of 30 to 100 fF with a pixel size of 10 $\mu$m, the thickness of $SiO_2$ ($\epsilon$=3.9) may be 250 to 850 Å, the thickness of SiN ($\epsilon$=6.5) may be 420 to 1400 Å, and the thickness of TaOx ($\epsilon$=27.6) may be 1800 to 6000 Å. These thickness values indicate that even if the insulation film is relatively thicker than a conventional structure, a storage capacitor equivalent to the conventional structure can be obtained. Therefore, the insulation film of the storage capacitors can easily be formed.

Figure 9:
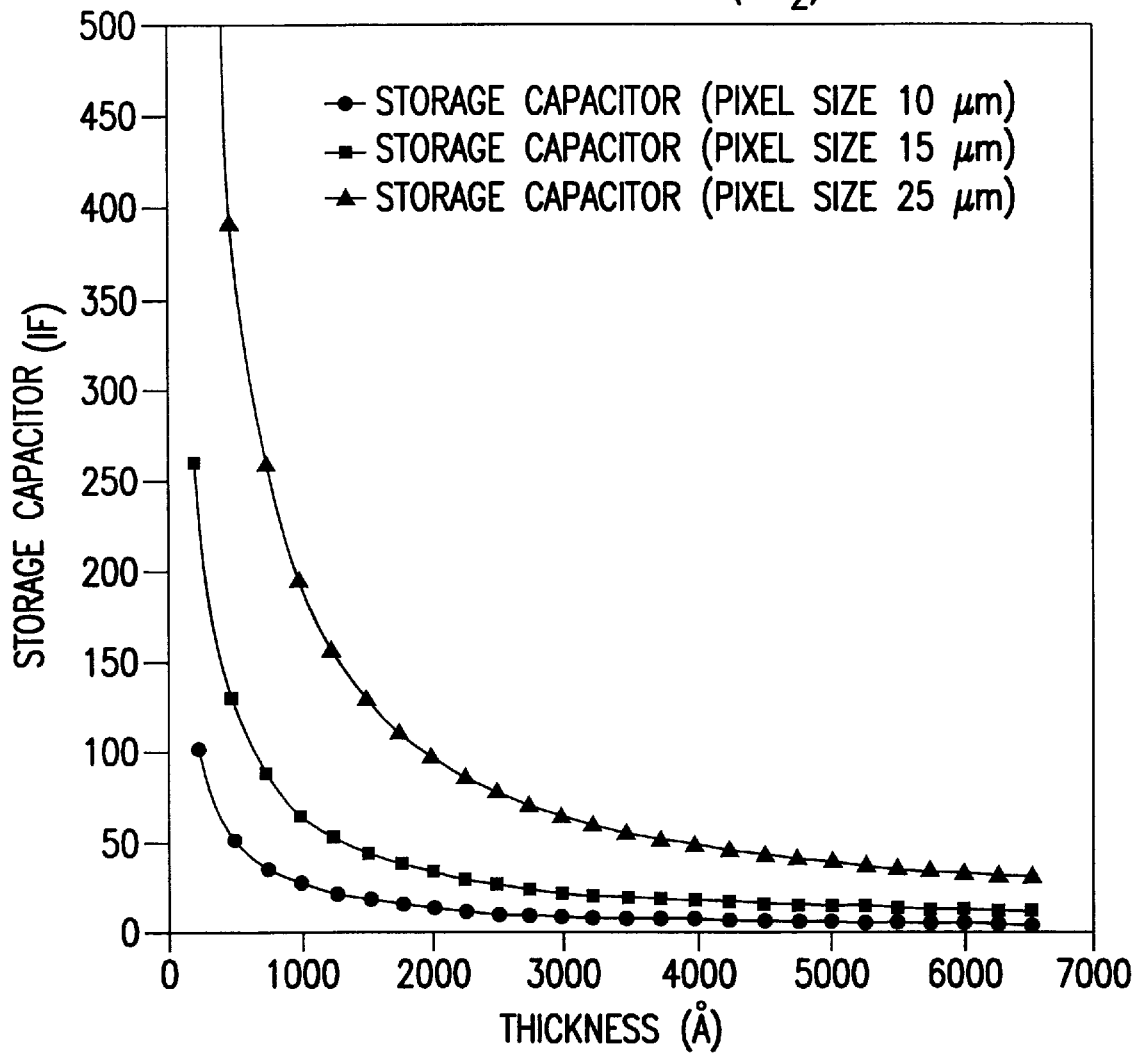
FIG. 9 is a plot showing variations in storage capacitor with the thickness of an insulation film for each of pixel sizes of a reflective liquid crystal panel of the present invention, in which the insulation film of the storage capacitor is made of $SiO_2$ ($\epsilon$=3.9)
Figure 10:
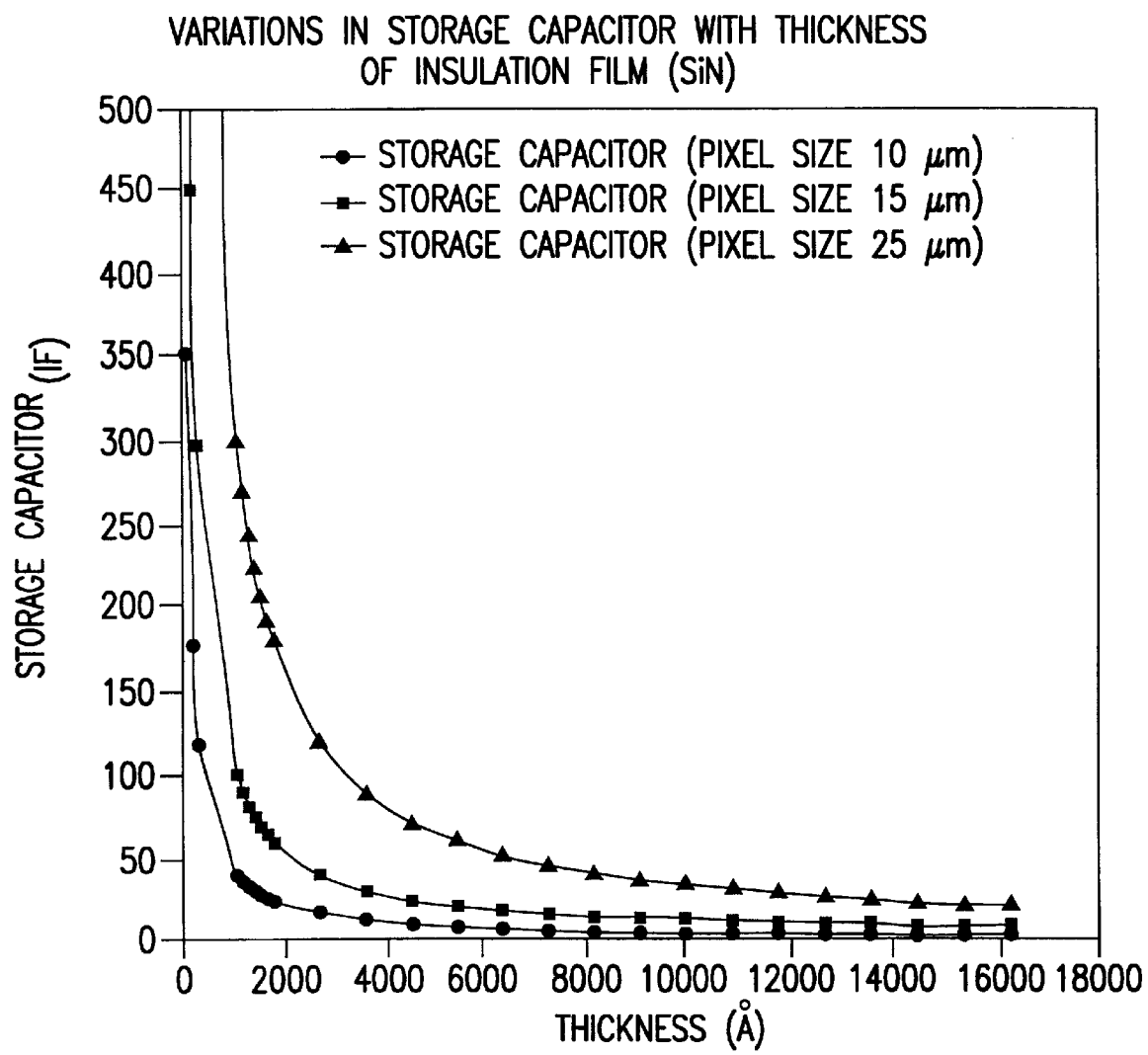
FIG. 10 is a plot showing variations in storage capacitor with the thickness of an insulation film for each of pixel sizes of a reflective liquid crystal panel of the present invention, in which the insulation film of the storage capacitor is made of SiN ($\epsilon$=6.5)
Figure 11:
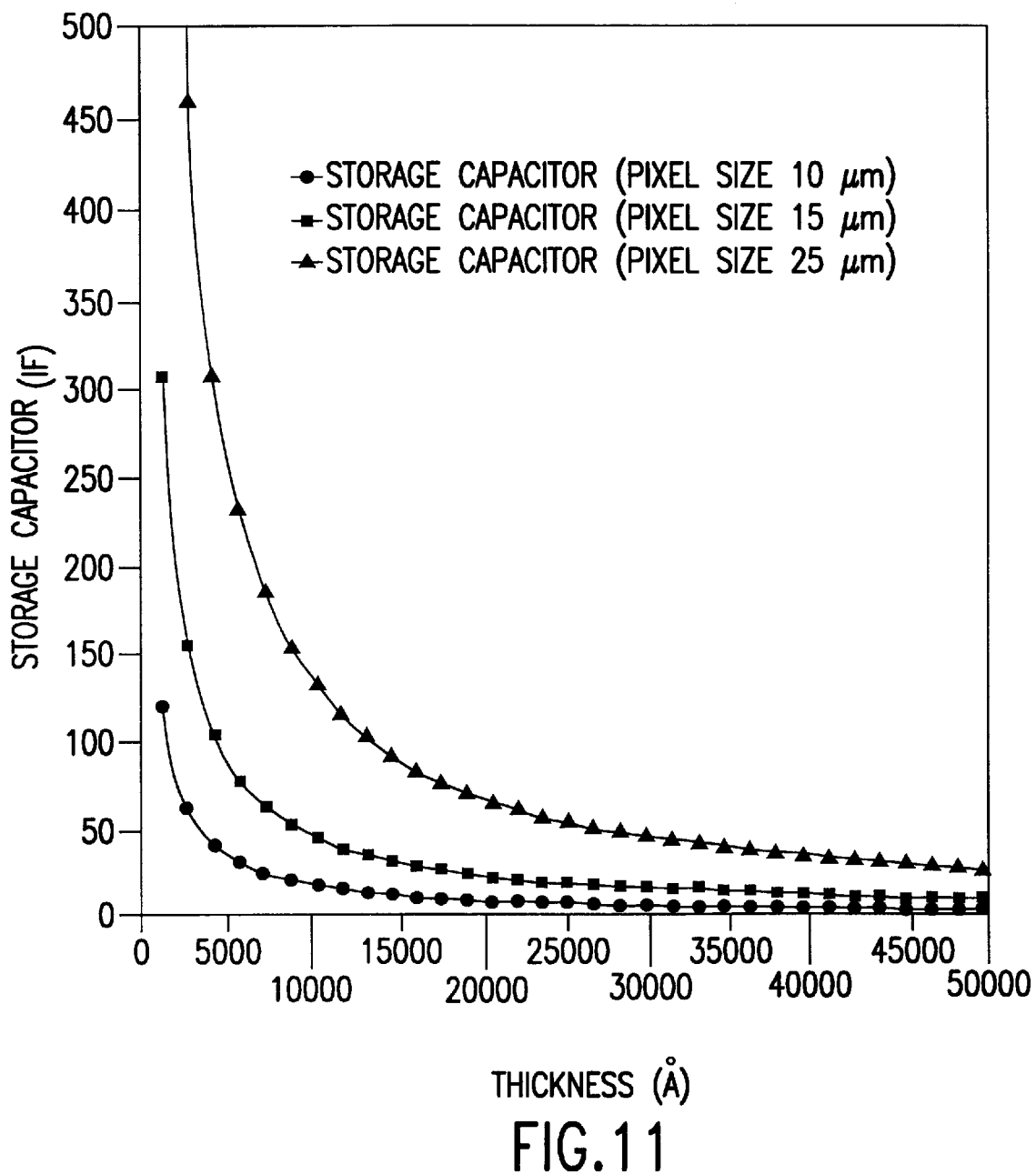
FIG. 11 is a plot showing variations in storage capacitor with the thickness of an insulation film for each of pixel sizes of a reflective liquid crystal panel of the present invention, in which the insulation film of the storage capacitor is made of TaOx ($\epsilon$=27.6)

Next, FIGS. 9 to 11 show variations in the storage capacitor value with changes in the thicknesses of the insulation films of $SiO_2$ ($\epsilon$=3.9), SiN ($\epsilon$=6.5) and TaOx ($\epsilon$=27.6), respectively, in accordance with the present invention. In each of these drawings, each with a pixel size of 10 $\mu$m, 15 $\mu$m and 25 $\mu$m, variation characteristics in the storage capacitor value with changes in the thickness of the insulation film 110 are shown for each of the materials of the insulation film. FIGS. 9, 10 and 11 show the cases of the insulation films of $SiO_2$ ($\epsilon$=3.9), SiN ($\epsilon$=6.5) and TaOx ($\epsilon$=27.6), respectively.

In the present invention, the following results were obtained.

(a) Pixel size of 10 $\mu$m (1) When the minimum necessary storage capacitor is assumed to be 30 fF, the thickness of the insulation film may be the following:

850 Å or less for $SiO_2$ ($\epsilon$=3.9);

1400 Å or less for SiN ($\epsilon$=6.5); and

6000 Å or less for TaOx ($\epsilon$=27.6).

(2) When the minimum necessary storage capacitor is assumed to be 50 fF, the thickness of the insulation film may be the following:

500 Å or less for $SiO_2$ ($\epsilon$=3.9);

850 Å or less for SiN ($\epsilon$=6.5); and

3600 Å or less for TaOx ($\epsilon$=27.6).

(3) When the minimum necessary storage capacitor is assumed to be 100 fF, the thickness of the insulation film may be the following:

250 Å or less for $SiO_2$ ($\epsilon$=3.9);

420 Å or less for SiN ($\epsilon$=6.5); and

1800 Å or less for TaOx ($\epsilon$=27.6).

(b) Pixel size of 15 $\mu$m (1) When the minimum necessary storage capacitor is assumed to be 30 fF, the thickness of the insulation film may be the following:

2100 Å or less for $SiO_2$ ($\epsilon$=3.9);

3600 Å or less for SiN ($\epsilon$=6.5); and

15000 Å or less for TaOx ($\epsilon$=27.6).

(2) When the minimum necessary storage capacitor is assumed to be 50 fF, the thickness of the insulation film may be the following:

1260 Å or less for $SiO_2$ ($\epsilon$=3.9);

2160 Å or less for SiN ($\epsilon$=6.5); and

9000 Å or less for TaOx ($\epsilon$=27.6).

(3) When the minimum necessary storage capacitor is assumed to be 100 fF, the thickness of the insulation film may be the following:

630 Å or less for $SiO_2$ ($\epsilon$=3.9);

1080 Å or less for SiN ($\epsilon$=6.5); and

4500 Å or less for TaOx ($\epsilon$=27.6).

(b) Pixel size of 20 $\mu$m (1) When the minimum necessary storage capacitor is assumed to be 30 fF, the thickness of the insulation film may be the following:

4000 Å or less for SiO$_2$ ($\epsilon$=3.9);

6700 Å or less for SiN ($\epsilon$=6.5); and

28000 Å or less for TaOx ($\epsilon$=27.6).

(2) When the minimum necessary storage capacitor is assumed to be 50 fF, the thickness of the insulation film may be the following:

2000 Å or less for SiO$_2$ ($\epsilon$=3.9);

3350 Å or less for SiN ($\epsilon$=6.5); and

14000 Å or less for TaOx ($\epsilon$=27.6).

(3) When the minimum necessary storage capacitor is assumed to be 100 fF, the thickness of the insulation film may be the following:

1000 Å or less for SiO$_2$ ($\epsilon$=3.9);

1680 Å or less for SiN ($\epsilon$=6.5); and

7000 Å or less for TaOx ($\epsilon$=27.6).

(b) Pixel size of 25 $\mu$m (1) When the minimum necessary storage capacitor is assumed to be 30 fF, the thickness of the insulation film may be the following:

6500 Å or less for SiO$_2$ ($\epsilon$=3.9);

10800 Å or less for SiN ($\epsilon$=6.5); and

46000 Å or less for TaOx ($\epsilon$=27.6).

(2) When the minimum necessary storage capacitor is assumed to be 50 fF, the thickness of the insulation film may be the following:

3900 Å or less for SiO$_2$ ($\epsilon$=3.9);

6480 Å or less for SiN ($\epsilon$=6.5); and

27600 Å or less for TaOx ($\epsilon$=27.6).

(3) When the minimum necessary storage capacitor is assumed to be 100 fF, the thickness of the insulation film may be the following:

1950 Å or less for SiO$_2$ ($\epsilon$=3.9);

3240 Å or less for SiN ($\epsilon$=6.5); and

13800 Å or less for TaOx ($\epsilon$=27.6).

As obvious from the above description, in a high definition liquid crystal panel having a pixel size (pixel pitch) of 25 $\mu$m or less (a pixel area of 626 $\mu$m$^2$ or less), supposing in the cases of using silicon dioxide, silicon nitride and tantalum oxide as the insulation film of the storage capacitors, the thickness of the insulation film of the storage capacitors is 6500 Å or less, 10800 Å or less and 46000 Å or less, respectively, and a capacitor value of 30 fF or more can be obtained. Therefore, in the present invention, good charge storage properties in the pixels can be maintained even if the liquid crystal panel has higher definition, and a thin insulation film need not be formed, thereby facilitating production and improving yield.

Further, as described above, in the use of an insulation film having a higher dielectric constant than SiO$_2$ ($\epsilon$=3.9), for example SiN ($\epsilon$=6.5) or TaOx ($\epsilon$=27.6), as the insulation film of the storage capacitors, sufficient storage capacitors can be ensured even if the insulation film has a large thickness of 10000 Å or more, and sufficient storage capacitors can be ensured even if the pixel size is decreased to 10 $\mu$m. Therefore, when SiN or TaOx is used for the insulation film of the storage capacitors, a thick insulation film can be formed, thereby facilitating the formation of the insulation film.

With the storage capacitor having the insulation film 110 of FIG. 1(A) made of SiN, moisture resistance can also be improved. Namely, where a generally used SiN film is formed as a passivation film on the reflective electrode by a plasma CVD process, there is a problem in that the reflectance in the visible light region greatly varies with variations in thickness of the SiN film even if the thickness of the SiN film varies by about 10%. It is thus difficult to use SiN for the passivation film on the reflective electrode. Therefore, in the present invention, SiO$_2$ is used for the passivation film on the reflective electrode, or no passsivation film is formed. In this case, since the insulation film 110 made of SiO$_2$ is insufficient from the viewpoint of shielding the substrate and elements from water, the insulation film 110 is made of SiN. The insulation film 110 made of SiN also functions as the passivation film, and thus moisture resistance can be improved as compared with the insulation film of SiO$_2$ having the low water shielding function.

Where the pixel size is decreased to 10 $\mu$m, and the insulation film is made of SiO$_2$, for example, in order to ensure a storage capacitor of 50 fF, the thickness of the insulation film 110 must be 500 Å or less, as shown in FIG. 5. In this case, there is the possibility that the second conductive layer 109 and the reflective electrode 112 as shown in FIG. 1(A) are short-circuited, or sufficient dielectric voltage resistance cannot be ensured. Although not shown in the drawings, a first storage capacitor containing, as a pair of electrodes, the second conductive layer 109 and the reflective electrodes 112 formed through the insulation film 110, which are formed in each of the pixels according to the present invention, and another storage capacitor, e.g., a second storage capacitor containing, as a pair of electrodes, the capacitor electrode 205b made of polycrystalline or metal silicide and the doped region 206c, as shown in FIG. 2, are preferably formed parallel. In this case, in order to ensure a storage capacitor 50 fF with a pixel size of 10 $\mu$m, the first storage capacitor may be 35 fF because a capacity value of 15 fF (the SiO$_2$ film having a thickness of 600 Å) can be ensured by the second storage capacitor, and the thickness of the insulation film 110 may be 850 Å.

Where only the storage capacitors 113 are formed without the second storage capacitors formed on the silicon substrate, a margin corresponding to the second storage capacitors occurs in the area of the surface of the substrate. In this case, for example, a memory device such as SRAM (Static Random Access Memory) or the like can be formed for each of the pixels by FET (a resistor element according to demand).

In the present invention, since the second conductive layer 109 not only serves as an electrode of each of the storage capacitors but also as a common electrode over the entire pixel region below the reflective electrodes 112, the second conductive layer 109 is formed in the space between the reflective electrodes 112 and thus also has the shielding function to prevent entrance of incident light into the semiconductor substrate through the space.

(Another example of the construction of the pixel region of the reflective electrode-side substrate of the present invention)

Figure 13:
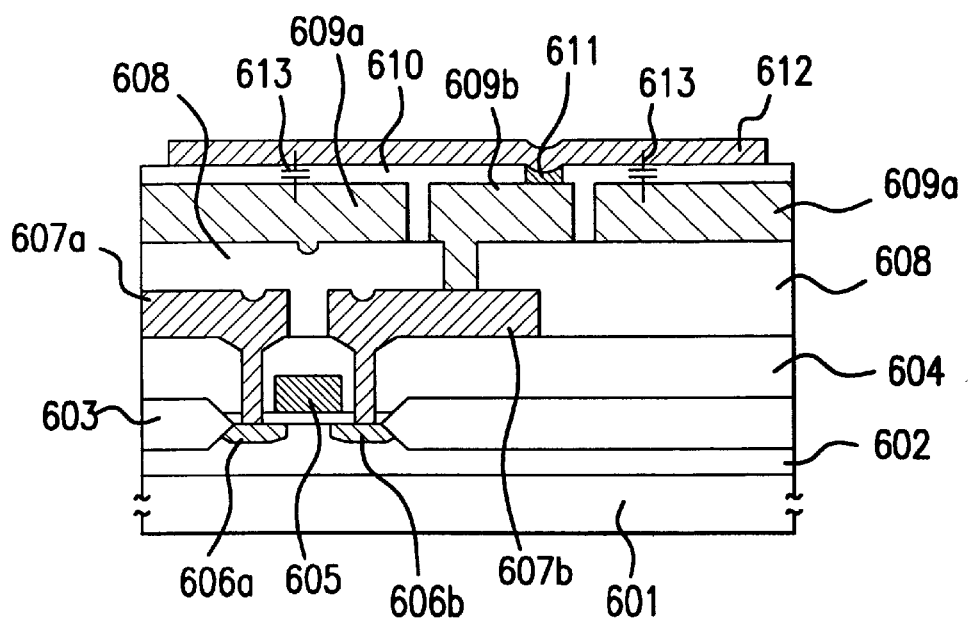
FIG. 13 is a sectional view showing the pixel region of a reflective electrode-side substrate of a reflective liquid crystal panel in accordance with a second embodiment of the present invention.

FIG. 13 is a sectional view showing the pixel region of a reflective electrode-side substrate in accordance with a second embodiment of the present invention. In this embodiment, the sectional structure of the reflective electrode-side substrate differs from the first embodiment. However, the equivalent circuits and the operation of the circuits, the structure of the liquid crystal panel, etc. are the same as the first embodiment. Like in the first embodiment, an N-channel transistor is arranged in each of the pixels.

Reference numeral 601 denotes a P-type semiconductor substrate (an N-type semiconductor substrate may be used), reference numeral 602 denotes a P-type well region having a higher impurity concentration than the substrate 601, reference numeral 603 denotes a field oxide film, and reference numeral 605 denotes a gate electrode. Reference numerals 606*a* and 606*b* denote source and drain regions made of an N-type doped layer having a higher impurity concentration than the well region 602, and reference numerals 607*a* and 607*b* denote first conductive layer portions serving as source and drain regions, respectively. Reference numeral 604 denotes a first interlayer insulation film made of an insulation film such as BPSG layer, and reference numeral 608 denotes a second interlayer insulation film such as $SiO_2$. Reference numerals 609*a* and 609*b* denote second conductive layer portions. Reference numeral 610 denotes a third interlayer insulation film, reference numeral 611 denotes a connecting plug, and reference numeral 612 denotes a third conductive layer serving as a pixel electrode containing a reflective electrode of a metal such as aluminum or the like.

The third interlayer insulation film 610 contains an insulation film of $SiO_2$ ($\epsilon$=3.9) or an insulation film which has a higher dielectric constant than $SiO_2$ such as SiN ($\epsilon$=6.5) or TaOx ($\epsilon$=27.6).

As shown in FIG. 13, in this embodiment, a first conductive layer includes first conductive layer portions 607*a* and 607*b*, and a second conductive layer includes second conductive layer portions 609*a* and 609*b*. The first conductive layer portion 607*b* is connected to the second conductive layer portion 609*b* through the contact hole provided in the second interlayer insulation film 608, and the second conductive layer portion 609*b* is connected to the reflective electrode 612 through the contact hole provided in the third interlayer insulation film 610. In the contact hole provided in the third interlayer insulation film 610 is buried the connecting plug 611 made of a high-melting-point metal such as tungsten or the like to electrically connect the second conductive layer portion 609*b* and the pixel electrode 612, like in the first embodiment. Since the contact hole provided in the insulation film 610 is shallow, the third conductive layer 612 may be connected directly to the second conductive layer 609*b* without using the connecting plug 611 made of a high-melting-point metal.

In this embodiment, a storage capacitor 613 is formed in a portion where the pixel electrode 612 is opposed to the second conductive layer portion 609*a* with the first interlayer insulation film 610 held therebetween.

As described above, in the construction of this embodiment, third interlayer insulation film 610, the second conductive layer portion 609*b* and the second interlayer insulation film 608 are separately etched. Where the third interlayer insulation film 610 and the second interlayer insulation film 608 are made of different films of, for example, SiN and $SiO_2$ or TaOx and $SiO_2$, the formation of the contact hole by etching the two insulation films with the same etching gas or etchant easily causes side etching of one of the insulation films due to a difference between the etching rates of the insulation films, thereby forming an eaves-like shape by processing. On the other hand, in the construction of this embodiment, since each of the insulation films can be etched with a suitable etching gas or etchant, no side etching occurs, and thus a good shape can be obtained by etching. Therefore, this embodiment is particularly effective for a case in which the third interlayer insulation film 610 and the second interlayer insulation film 608 are made of different films.

Figure 14:
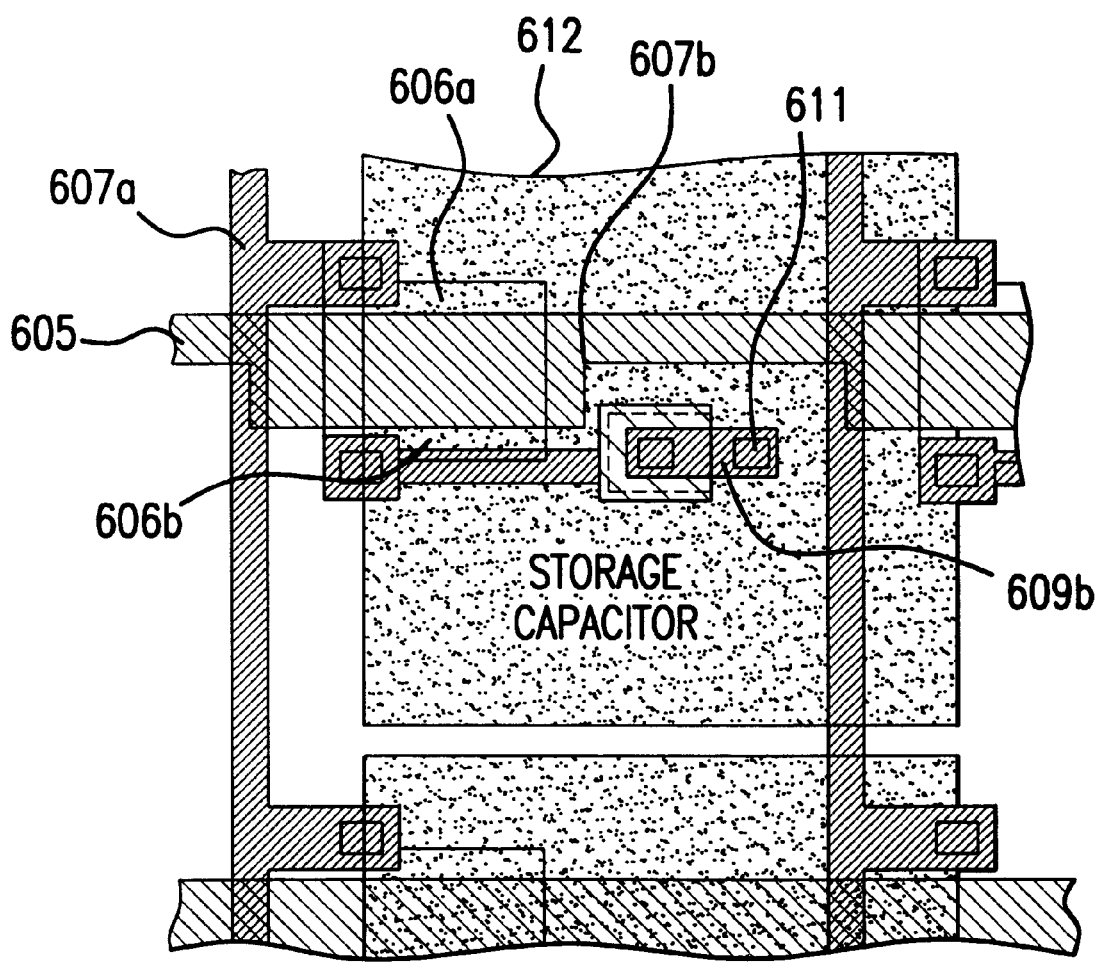
FIG. 14 is a plan view showing the pixel region of the reflective electrode-side substrate of the reflective liquid crystal panel in accordance with the second embodiment of the present invention.

FIG. 14 is a plan view showing the pixel region of the reflective electrode-side substrate of the liquid crystal panel shown in FIG. 13. In FIG. 13, scanning lines (the same layer as gate electrodes) 605 are extended in the row direction of the pixel arranged in a matrix. On the other hand, source electrodes (data lines) 607*a* are extended in the column direction of the pixels. Each of the source electrodes 607*a* is connected to a source 606*a* of FET, and a drain electrode 607*b* is connected to a drain 606*b* opposed to the source with a channel formed in between, and led out from the drain. The drain electrode 607*b* is connected to the pixel electrode 612 through the connecting plug 611. The second conductive layer portion 609*a* shown in FIG. 13 is formed below the pixel electrode 612 with the insulation film 610 in between. The second conductive layer portion 609*a* is continuously formed over the entire region of a plurality of pixels, i.e., over the entire pixel region, except the connection region of the second conductive layer portion 609*b* in each of the pixels. Therefore, the area close to the area of the pixel electrode 612 can be used for the storage capacitor.

Like in the first embodiment, the third interlayer insulation film 610 shown in FIG. 13 which constitutes the storage capacitor 613 is an insulation film of $SiO_2$, SiN or TaOx, and the thickness thereof is set as described above with reference to FIGS. 6 to 11.

In this embodiment, since the second conductive layer portion 609*a* not only serves as an electrode of each of the storage capacitors but also as a common electrode below the reflective electrodes 612 over the entire pixel region, the second conductive layer portion 609*a* is formed in the space between the respective reflective electrodes 612, and thus also has the light shielding function to prevent entrance of incident light into the semiconductor substrate through the space.

In this embodiment, the source and drain of FET can be exchanged.

(Other example of the construction of the pixel region of the reflective electrode-side substrate of the present invention)

Figure 18:
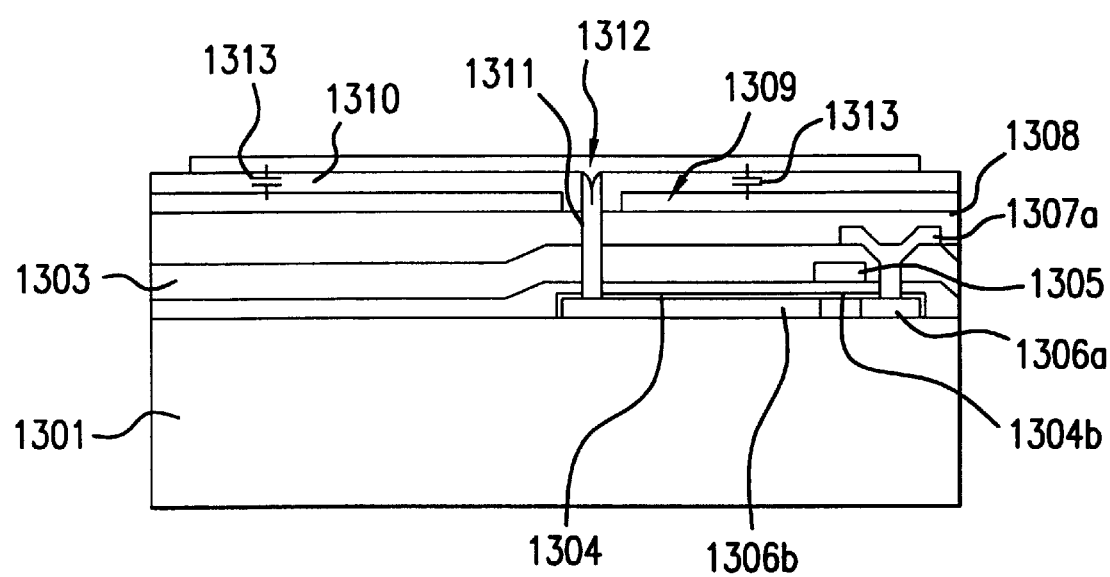
FIG. 18 is a sectional view showing the pixel region of a reflective electrode-side substrate of a reflective liquid crystal panel in accordance with a third embodiment of the present invention.

FIG. 18 is a sectional view showing the pixel region of a reflective electrode-side substrate of a reflective liquid crystal panel in accordance with a third embodiment of the present invention. In this embodiment, an N-channel TFT is used as a pixel switching transistor. In this embodiment, the sectional structure of the reflective electrode-side substrate differs from the first embodiment, but the equivalent circuits and the operation thereof, the structure of a liquid crystal panel, etc. are the same as the first embodiment.

Reference numeral 1301 denotes an insulation substrate made of quartz or non-alkali glass on which a single crystal, polycrystalline, or amorphous silicon film (a layer having regions 1306*a* and 1306*b*) is formed. On this silicon film is formed an insulation film 1304*b* having a two-layer structure containing a silicon oxide film formed by thermal oxidation and a silicon nitride film deposited by the CVD process. Before the silicon nitride film as the upper layer of the insulation film 1304*b* is formed, the regions 1306*a* and the 1306*b* of the silicon film are doped with an N-type impurity to form the source region 1306*a* and the drain region 1306*b* of TFT. On the insulation film 1304*b* are further formed the gate electrode of TFT and a wiring layer 1305 made of polycrystalline or metal silicide, which constitutes the scanning lines.

Formed on the wiring layer 1305 are an insulation film 1303 containing a silicon nitride film or a silicon oxide film, and a source electrode (data lines) 1307*a* made of a metal layer of aluminum and connected to the source region 1306*a* through the contact hole formed in the insulation film 1303. Formed on the metal layer is an insulation film 1308 containing a silicon nitride film or having a two-layer structure including a silicon oxide film and a silicon nitride film. The insulation film 1308 is preferably formed as an interlayer insulation film having a two-layer structure. This can provide the effect of moisture resistance or the like. Formed on the insulation film 1308 is an intermediate conductive layer 1309 on which an insulation film 1310 is formed. Formed on the insulation film 1310 is formed a pixel electrode 1312 as the reflective electrode made of aluminum for each of the pixels.

The drain region 1306b of the silicon film is electrically connected to the pixel electrode 1312 through a contact hole. This connection is performed by burying a connecting plug 1311 made of a high-melting-point metal such as tungsten or the like.

Although FIG. 18 shows a top gate type in which a gate electrode is positioned above the channel, a bottom gate type may be employed in which the gate electrode is first formed, and a silicon film for the channel is arranged through the gate insulation film.

The intermediate conductive layer 1309 is continuously formed over the entire region of a plurality of pixels, i.e., the entire pixel region, except the connection region between the drain region 1306b and the pixel electrode 1312 in each of the pixels. Therefore, an area close to the pixel electrode 1309 is used for the storage capacitor 1313.

Like in the first embodiment, the insulation film 1310 which constitutes the storage capacitor 1313 is an insulation film made of $SiO_2$, SiN or TaOx, and the thickness thereof is set as described above with reference to FIGS. 6 to 11.

In the present invention, since the intermediate conductive layer 1309 is formed not only as an electrode of the storage capacitor but also as a common electrode below the reflective electrodes over the entire pixel region, the intermediate conductive layer 1309 is formed in the space between the respective reflective electrodes 1312, and thus also has the shielding function to prevent entrance of incident light into the silicon layer through the space.

In this embodiment, the source and drain of FET may be exchanged.

(Description of the structure of the liquid crystal panel of the present invention)

FIG. 15(A) is a plan view showing the entirety of the liquid crystal panel substrate (reflective electrode-side substrate) 801 in accordance with the first, second or third embodiment.

As shown in FIG. 15(A), in this embodiment, the light shielding film 825 is provided for preventing incidence of light to the peripheral circuits provided in the periphery of the substrate. Provided in the periphery of the pixel region 820 in which the pixel electrodes including the reflective electrodes are arranged in a matrix are peripheral circuits including the data line driving circuit 821 for supplying an image signal to the data lines (107a in FIG. 1(A) or 607a in FIG. 13) according to image data, the scanning line driving circuit 822 for successively scanning the scanning lines (105 in FIG. 1(B) or 605 in FIG. 13), the input circuit 823 to which image data is input from the outside through the pad region 826, and the timing control circuit 824 for controlling these circuits, etc. Each of the circuits consists of the transistors like a pixel electrode switching element and load elements such as a resistor and a capacitor. Reference numeral 836 denotes the region in which a sealing material for adhesion to an opposite glass substrate is formed.

In this embodiment, the light shielding film 825 contains the third conductive layer formed in the same step as the pixel electrode 112 shown in FIG. 1(A) or the pixel electrode 612 shown in FIG. 9 so that the predetermined potential such as the source potential, the central potential of an image signal or the common electrode potential is applied to the light shielding film 825. By applying the predetermined potential to the light shielding film 825, reflection can be decreased as compared with floating or the case of another potential. Reference numeral 826 denotes the pad region where a pad or terminal used for supplying the source voltage is formed.

FIG. 15(B) is a drawing showing the sectional structure of the reflective liquid crystal panel to which the liquid crystal panel substrate (801 in FIG. 15(A)) was applied. As shown in FIG. 15(B), adhered to the back of the liquid crystal panel substrate 931 is a support substrate 932 made of glass or ceramic by using an adhesive. In addition, an incidence-side glass substrate 935 containing the counter electrode (or the common electrode) 933 made of a transparent conductive film (ITO) to which the common electrode potential $V_{COM}$ is applied is arranged on the front side of the liquid crystal panel substrate 931 at an appropriate distance therebetween. The space between both substrates whose peripheries are adhered with the sealing material 936 formed in the sealing material formation region 836 shown in FIG. 15(A) is filled with a known TN (Twisted Nematic) liquid crystal or SH (Super Homeotropic) liquid crystal 937 in which liquid crystal molecules are almost vertically aligned with no voltage applied, to form a liquid crystal panel 930. The position of the shielding material is set so that the pad region 926 (826 in FIG. 15(A)) is on the outside of the sealing material 936 in order to input signals from the outside.

On the peripheral circuits, the light shielding film 925 (825 In FIG. 15(A)) is formed opposite to the counter electrode 933 with the liquid crystal 937 held therebewteen. When the common electrode potential $V_{COM}$ is applied to the light shielding film 925, the common electrode potential $V_{COM}$ is applied to the counter electrode 933, and thus no DC voltage is applied to the liquid crystal held between the light shielding film 925 and the counter electrode 933. As a result, in the TN liquid crystal, liquid crystal molecules are always twisted for about 90°, and in the SH liquid crystal, liquid crystal molecules are kept in a vertical alignment state.

In this embodiment, since the support substrate 932 made of glass or ceramic is adhered by an adhesive to the back of the liquid crystal panel substrate 931 containing a semiconductor substrate, the strength of the liquid crystal panel substrate 931 is significantly enhanced. As a result, after the support substrate 932 has been adhered to the liquid crystal panel substrate 931, the liquid crystal panel substrate 931 is adhered to the opposite substrate, thereby causing the advantageous uniformity of the gap of the liquid crystal layer over the entire panel.

In the first, second or third embodiment, in the peripheral circuit region shown in FIGS. 15(A)–(B), the predetermined potential Vref (including the common electrode potential $V_{COM}$) is applied to the conductive layer (109 in the first embodiment, 609a in the second embodiment, or 1309 in the third embodiment) opposed to the pixel electrode to form the storage capacitor. The predetermined voltage Vref is the potential input from the pad region 826.

(Description of electronic apparatus using the liquid crystal panel of the present invention)

An example of electronic apparatus using the reflective liquid crystal panel of the present invention as a display device will be described below.

Figure 16:
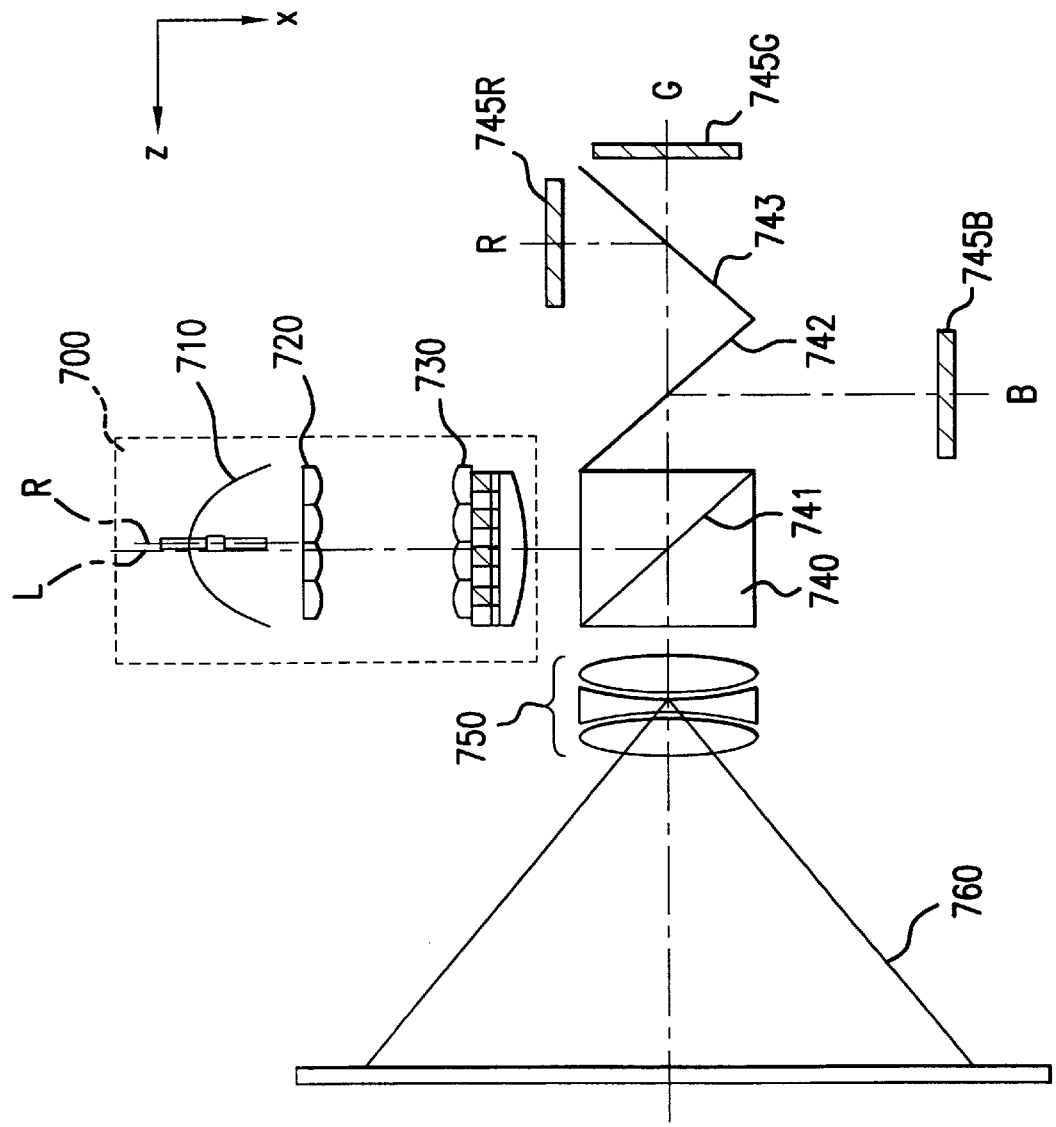
FIG. 16 is a schematic drawing showing the construction of a projection type display device containing a reflective liquid crystal panel used as a light valve in accordance with an embodiment of the present invention.

FIG. 16 is a schematic plan view showing the construction of a principal portion of a projector (projective display device) using the reflective liquid crystal panel as a light valve as an example of electronic apparatus using the liquid crystal panel of the present invention. FIG. 16 is also a sectional view taken along the XZ plane passing through the center of an optical device 750. The projector of this example contains a polarization illumination device 700 substantially containing a light source unit 710 disposed along the optical axis L of the system, an integrator lens 720, and a polarization converter 730; a polarized light beam splitter 740 for reflecting the S-polarized light beam emitted from the polarization illumination device 700 by a S-polarized light beam reflective surface 741; a dichroic mirror 742 for separating a blue light (B) component from the light reflected from the S-polarized light reflective surface 741 of the polarized light beam splitter 740; a reflective liquid crystal light valve 745B for modulating the separated blue light (B); dichroic mirror 743 for reflecting and separating a red light (R) component from the beam from which the blue light is separated; a reflective liquid crystal light valve 745R for modulating the separated red light (R); a reflective liquid crystal light valve 745G for modulating the residual green light (G) transmitted through the dichoic mirror 743; and a projection optical system 750 containing a projection lens for projecting, on a screen 760, the light synthesized by the dichroic mirrors 743 and 742 and the polarized light beam splitter 740 from the light modulated by the three reflective liquid crystal light valves 745R, 745G and 745B. Each of the three reflective liquid crystal light valves 745R, 745G and 745B contains the liquid crystal panel shown in FIG. 15.

The random polarized light beam emitted from the light source unit 710 is divided into a plurality of intermediate light beams by the integrator lens 720, converted into a type of polarized light beam (S polarized light beam) in which the polarization direction is substantially uniform, by the polarization converter 730 having a second integrator lens on the incidence side thereof, and then reaches the polarized light beam splitter 740. The S-polarized light beam emitted from the polarization converter 730 is reflected by the S polarized light beam reflective surface 741 of the polarized light beam splitter 740. Of the reflected light beam, the blue light (B) beam is reflected by the blue light reflective layer of the dichroic mirror 742, and modulated by the reflective liquid crystal light valve 745B. Of the light beam transmitted through the blue light reflective layer of the dichroic mirror 742, the red light (R) beam is reflected by the red light reflective layer of the dichoic mirror 743 and modulated by the reflective liquid crystal light valve 745R. On the other hand, the green light (G) beam transmitted through the red light reflective layer of the dichroic mirror 743 is modulated by the reflective liquid crystal light valve 745G. In this way, the color light is modulated by each of the reflective liquid crystal light valves 745R, 745G and 745B.

The reflective liquid crystal panel used as each of the reflective liquid crystal light valves 745R, 745G and 745B contains a TN liquid crystal (a liquid crystal in which the long axes of the liquid crystal molecules are aligned in substantially parallel to the panel substrate with no voltage applied), or a SH liquid crystal (a crystal in which the long axes of the liquid crystal molecules are aligned substantially perpendicularly to the panel substrate with no voltage applied).

In the use of the TN liquid crystal, in a pixel (an OFF pixel) in which the voltage applied to the liquid crystal layer held between the reflective electrode of the pixel and the common electrode on the opposite substrate is less than the threshold voltage of the liquid crystal, incident color light is changed to elliptically polarized light by the liquid crystal layer, reflected by the reflective electrode, and reflected and emitted, through the liquid crystal layer, as light close to elliptically polarized light containing a large amount of component having the polarization axis shifted from that of the incident color light by about 90 degrees. On the other hand, in a pixel (an ON pixel) in which the voltage applied to the liquid crystal layer is higher than the threshold voltage of the liquid crystal, incident color light reaches the reflective electrode without a change, is reflected, and then is reflected and emitted as light having the same polarization axis as the incident light. Since the alignment angle of the liquid crystal molecules of the TN liquid crystal changes according to the voltage applied to the reflective electrodes, the angle of the polarization axis of reflected light with respect to incident light is changed according to the voltage applied to the reflective electrodes through pixel FET.

In the use of the SH type liquid crystal, in a pixel (an OFF pixel) in which the voltage applied to the liquid crystal layer is less than the threshold voltage of the liquid crystal, incident color light reaches the reflective electrode without a change, is reflected, and then is reflected and emitted as light having the same polarization axis as the incident light. On the other hand, in a pixel (an ON pixel) in which the voltage applied to the liquid crystal layer is higher than the threshold voltage of the liquid crystal, incident color light is changed to elliptically polarized light by the liquid crystal layer, is reflected by the reflective electrode, and is reflected and emitted, through the liquid crystal layer, as light close to elliptically polarized light containing a large amount of component having the polarization axis shifted from that of the incident color light by about 90 degrees. Like the TN liquid crystal, since the alignment angle of the liquid crystal molecules of the TN liquid crystal changes according to the voltage applied to the reflective electrodes, the angle of the polarization axis of reflected light with respect to incident light is changed according to the voltage applied to the reflective electrodes through pixel FET.

Of the color light reflected by the pixels of the liquid crystal panel, the S polarized light component is not transmitted through the polarized light beam splitter 740 which reflects S polarized light, while the P polarized light component is transmitted. The light transmitted through the polarized light beam splitter 740 forms an image. Therefore, in the use of the TN liquid crystal for the liquid crystal panel, reflected light of OFF pixels reaches the projection optical system 750, and reflected light of ON pixels does not reach the lens to display a projected image normally white. On the other hand, in the use of the SH liquid crystal, reflected light of OFF pixels does not reach the projection optical system, and, reflected light of ON pixels reaches the projection optical system 750 to display a projected image normally black.

Since the pixels of the reflective liquid crystal panel are formed by utilizing a semiconductor technique, a large number of pixels can be formed, and the panel size can be decreased as compared with an active matrix type liquid crystal panel having TFT arrays formed on a glass substrate. Therefore, it is possible to project a high-definition image and decrease the size of the projector.

As described above with reference to FIG. 15(A), the peripheral circuit portion of the liquid crystal panel is covered with the light shielding film, and the same potential as the common electrode formed at the opposite position on the opposite substrate (for example, the common electrode potential) is applied, thereby applying substantially zero V to the liquid crystal held between both substrates, and bringing the liquid crystal into an OFF state. However, when the applied potential is not the common electrode potential, since the potential is different from that of the common electrode of the pixel portion, the peripheral opposite electrode is separated from the common electrode of the pixel portion. Therefore, in the liquid crystal panel containing the TN liquid crystal, the whole periphery of the image region can be displayed white in correspondence with normally white display, while in the liquid crystal panel containing the SH liquid crystal, the entire periphery of the image region can be displayed black in correspondence with normally black display.

In this embodiment, the voltage applied to the pixel electrodes of each of the reflective liquid crystal panels 745R, 745G and 745B is sufficiently held, and a clear image can be obtained due to very high reflectance of the pixel electrodes.

Figure 17A:
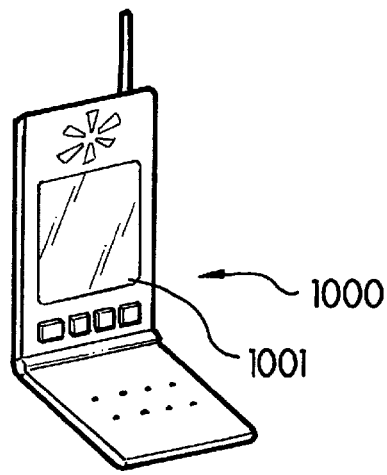
FIGS. 17(a)–17(c) are drawings showing the appearances of a portable telephone, a wrist watch type television and a personal computer, each of which uses a reflective liquid crystal panel in accordance with an embodiment.
Figure 17B:
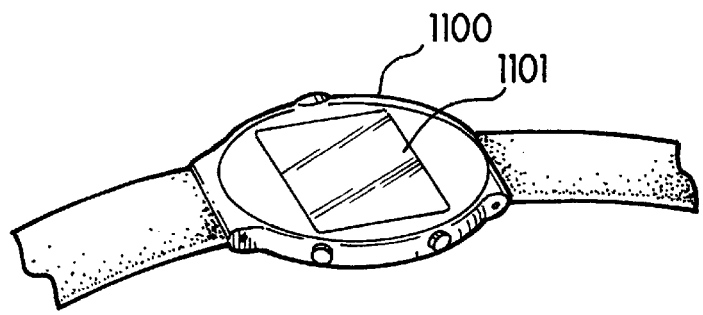
Figure 17C:
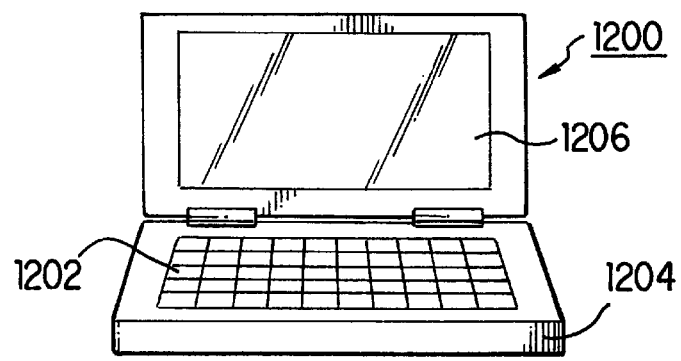

FIGS. 17(a)–17(c) are drawings of the appearances of examples of electronic apparatuses or containing the reflective liquid crystal panel of the present invention. In these electronic apparatuses, the reflective liquid crystal panel is used as a direct-vision reflective liquid crystal panel, not as a light valve used together with a polarized light beam splitter. Therefore, the reflective electrodes need not have a complete mirror surface, and preferably have suitable unevenness in order to widen the angle of visibility. Other components are basically the same as the light valve.

FIG. 17(a) is a perspective view showing a portable telephone. Reference numeral 1000 denotes the body of the portable telephone, and reference numeral 1001 denotes a liquid crystal display unit containing the reflective liquid crystal panel of the present invention.

FIG. 17(b) is a drawing showing a wrist watch type of electronic apparatus. Reference numeral 1100 denotes the body of the watch, and reference numeral 1101 denotes a liquid crystal display unit containing the reflective liquid crystal panel of the present invention. Since the liquid crystal panel has pixels with higher definition than a conventional watch display unit, television image display can be made, and thus a wrist watch type television can be realized.

FIG. 17(c) is a drawing showing a portable information processing device such as a word processor, a personal computer, or the like. Reference numeral 1200 denotes an information processing device. Reference numeral 1202 denotes an input unit such as a keyboard or the like, reference numeral 1206 denotes a display unit using the reflective liquid crystal panel of the present invention, and reference numeral 1204 denotes the body of the information processing device. Since each of the electronic apparatus is driven by a battery, the use of a reflective liquid crystal panel without a light source lamp permits an increase in the life of the battery. As in the present invention, since the peripheral circuits can be contained in the panel substrate, the number of the parts can significantly decreased, thereby decreasing the weight and size of apparatus.

In the present invention having the above-described construction, the storage capacitor provided in each of the pixels of the reflective liquid crystal panel can be provided in a region having a wide area excluding the connection portion between the reflective electrode and the source or the drain electrode in each region of the pixels, and a sufficient storage capacitor value can be ensured for each of the pixels. Namely, since an area close to the pixel region can be used for the storage capacitors, and a large storage capacitor is obtained, a voltage can stably be applied to the reflective electrodes.

What is claimed is:

1. A liquid crystal panel substrate comprising:
reflective electrodes formed in a matrix on a substrate;
transistors respectively formed below and in correspondence with the reflective electrodes, each of the transistors having a source electrode and a drain electrode, the transistors for applying a voltage to the reflective electrodes;
an intermediate conductive layer formed between the reflective electrodes and one of the source electrode and the drain electrode of the transistors; and
storage capacitors for storing charge respectively electrically connected to the reflective electrodes, each of the storage capacitors comprising an insulation film formed between the reflective electrodes and the intermediate conductive layer arranged below the reflective electrodes, a predetermined potential being applied to the intermediate conductive layer, the intermediate conductive layer comprising a metal layer continuously formed below the reflective electrodes and below a space between the reflective electrodes respectively disposed adjacent to the reflective electrodes, wherein the intermediate conductive layer is connected to a wiring layer to apply the predetermined potential in a peripheral region of a pixel region of the liquid crystal panel substrate, the intermediate conductive layer being used as a common electrode to serve as electrodes which respectively constitute the storage capacitors of the pixels.

2. The liquid crystal panel substrate according to claim 1, the wiring layer being electrically connected to the intermediate conductive layer, wherein the wiring layer applying one of approximately: 1) a first potential of a common electrode opposed to the reflective electrode with a liquid crystal held therebetween, 2) a second potential one-half of an amplitude of a voltage to be applied to the reflective electrodes, or 3) an intermediate potential between the first and second potentials.

3. The liquid crystal panel substrate according to claim 2, wherein the surface of the intermediate conductive layer has a flattened surface, and the insulation film is formed on the flattened surface.

4. The liquid crystal panel substrate according to claim 1, wherein each of the reflective electrodes is electrically connected to one of the source and drain electrodes of a corresponding transistor.

5. The liquid crystal panel substrate according to claim 1, wherein the insulation film interposed between a pair of electrodes of each of the storage capacitors is made of silicon dioxide.

6. The liquid crystal panel substrate according to claim 1, wherein the insulation film interposed between a pair of electrodes of each of the storage capacitors is made of a material having a higher dielectric constant than silicon dioxide.

7. The liquid crystal panel substrate according to claim 1, the predetermined potential further being used in a peripheral circuit arranged in the peripheral region.

8. A liquid crystal panel substrate comprising:
reflective electrodes formed in a matrix on a substrate;
transistors respectively formed below and in correspondence with the reflective electrodes, each of the transistors having a source electrode and a drain electrode, the transistors for applying a voltage to the reflective electrodes;
an intermediate conductive layer formed between the reflective electrodes and one of the source electrode and the drain electrode of the transistors; and
storage capacitors for storing charge respectively electrically connected to the reflective electrodes, each of the storage capacitors comprising an insulation film formed between the reflective electrodes and the intermediate conductive layer arranged below the reflective electrodes, a predetermined potential being applied to the intermediate conductive layer, wherein each of the reflective electrodes is electrically connected to one of the source and drain electrodes of a corresponding transistor through a connector comprising a same layer as the intermediate conductive layer and is electrically isolated from the intermediate conductive layer.

9. A liquid crystal panel substrate comprising:

reflective electrodes formed in a matrix on a substrate;

transistors respectively formed below and in correspondence with the reflective electrodes for applying a voltage to the reflective electrodes, each of the transistors having a source electrode and a drain electrode;

an intermediate conductive layer formed between the reflective electrodes and one of the source electrode and the drain electrode of the transistors; and storage capacitors for storing charge respectively electrically connected to the reflective electrodes, each of the storage capacitors comprising an insulation film formed between the reflective electrodes and the intermediate conductive layer arranged below the reflective electrodes, a predetermined potential being applied to the intermediate conductive layer, wherein the insulation film interposed between a pair of electrodes of each of the storage capacitors is made of silicon dioxide, the liquid crystal panel has a pixel size of 25 $\mu$m or less or a pixel area of 625 $\mu m^2$ or less, and the insulation film has a thickness of 6500 Å or less, so that capacitance of the storage capacitors is 30 fF or more.

10. A liquid crystal panel substrate comprising:

reflective electrodes formed in a matrix on a substrate;

transistors respectively formed below and in correspondence with the reflective electrodes for applying a voltage to the reflective electrodes, each of the transistors having a source electrode and a drain electrode;

an intermediate conductive layer formed between the reflective electrodes and one of the source electrode and the drain electrode of the transistors; and storage capacitors for storing charge respectively electrically connected to the reflective electrodes, each of the storage capacitors comprising an insulation film formed between the reflective electrodes and the intermediate conductive layer arranged below the reflective electrodes, a predetermined potential being applied to the intermediate conductive layer, wherein the insulation film is made of silicon nitride, the silicon nitride being formed over the transistors.

11. The liquid crystal panel substrate according to claim 10, the silicon nitride having a water-shielding function which shields the transistors from water.

12. A liquid crystal panel substrate comprising:

reflective electrodes formed in a matrix on a substrate;

transistors respectively formed below and in correspondence with the reflective electrodes for applying a voltage to the reflective electrodes, each of the transistors having a source electrode and a drain electrode;

an intermediate conductive layer formed between the reflective electrodes and one of the source electrode and the drain electrode of the transistors; and storage capacitors for storing charge respectively electrically connected to the reflective electrodes, each of the storage capacitors comprising an insulation film formed between the reflective electrodes and the intermediate conductive layer arranged below the reflective electrodes, a predetermined potential being applied to the intermediate conductive layer, wherein the insulation film is made of silicon nitride, the liquid crystal panel has a pixel size of 25 $\mu$m or less or a pixel area of 625 $\mu m^2$ or less, and the insulation film has a thickness of 10800 Å or less, so that capacitance of the storage capacitors is 30 fF or more.

13. A liquid crystal panel substrate comprising:

reflective electrodes formed in a matrix on a substrate;

transistors respectively formed below and in correspondence with the reflective electrodes for applying a voltage to the reflective electrodes, each of the transistors having a source electrode and a drain electrode;

an intermediate conductive layer formed between the reflective electrodes and one of the source electrode and the drain electrode of the transistors; and storage capacitors for storing charge respectively electrically connected to the reflective electrodes, each of the storage capacitors comprising an insulation film formed between the reflective electrodes and the intermediate conductive layer arranged below the reflective electrodes, a predetermined potential being applied to the intermediate conductive layer, wherein the liquid crystal panel has a pixel size of 25 $\mu$m or less or a pixel area of 625 $\mu m^2$ or less, and the insulation film is made of tantalum oxide and has a thickness of 46000 Å or less, so that capacitance of the storage capacitors is 30 fF or more.

14. A liquid crystal panel substrate comprising:

reflective electrodes formed in a matrix on a substrate;

transistors respectively formed below and in correspondence with the reflective electrodes, each of the transistors having a source electrode and a drain electrode, the transistors for applying a voltage to the reflective electrodes;

an intermediate conductive layer formed between the reflective electrodes and one of the source electrode and the drain electrode of the transistors;

storage capacitors for storing charge respectively electrically connected to the reflective electrodes, each of the storage capacitors comprising an insulation film formed between the reflective electrodes and the intermediate conductive layer arranged below the reflective electrodes, a predetermined potential being applied to the intermediate conductive layer, wherein the intermediate conductive film is formed by using tantalum, and the insulation film is formed by anodic oxidation of the tantalum.

15. A liquid crystal panel comprising:

a liquid crystal panel substrate;

a transparent substrate arranged opposite to the liquid crystal panel substrate with a space therebetween; and a liquid crystal held in the space between the liquid crystal panel substrate and the transparent substrate;

the liquid crystal panel substrate comprising:

reflective electrodes formed in a matrix on a substrate;

transistors respectively formed below and in correspondence with the reflective electrodes, each of the transistors having a source electrode and a drain electrode, the transistors for applying a voltage to the reflective electrodes;

an intermediate conductive layer formed between the reflective electrodes and one of the source electrode and the drain electrode of the transistors; and storage capacitors for storing charge respectively electrically connected to the reflective electrodes, each of the storage capacitors comprising an insulation film formed between the reflective electrodes and the intermediate conductive layer arranged below the reflective electrodes, a predetermined potential being applied to the intermediate conductive layer, the intermediate conductive layer comprising a metal layer continuously formed below the reflective electrodes and below a space between the reflective electrodes respectively disposed adjacent to the reflective electrodes, wherein the intermediate conductive layer is connected to a wiring layer for applying the predetermined potential in a peripheral region of a pixel region of the liquid crystal panel substrate, the intermediate conductive layer being used as a common electrode to serve as electrodes which respectively constitute the storage capacitors of the pixels.

16. The liquid crystal panel according to claim 15, the wiring layer being electrically connected to the intermediate conductive layer, the liquid crystal panel substrate further comprising a common electrode arranged opposite to the reflective electrodes with a liquid crystal held therebetween and the wiring layer applying one of approximately: 1) a first potential of the common electrode, 2) a second potential one-half of an amplitude of a voltage to be applied to the reflective electrodes, or 3) an intermediate potential between the first and second potentials.

17. The liquid crystal panel according to claim 16, wherein the surface of the intermediate conductive layer has a flattened surface, and the insulation film is formed on the flattened surface.

18. The liquid crystal panel according to claim 15, wherein each of the reflective electrodes is electrically connected directly to one of the source and drain electrodes of a corresponding transistor.

19. The liquid crystal panel according to claim 15, the predetermined potential further being used in a peripheral circuit arranged in the peripheral region.

20. A liquid crystal panel comprising:
a liquid crystal panel substrate;
a transparent substrate arranged opposite to the liquid crystal panel substrate with a space therebetween; and
a liquid crystal held in the space between the liquid crystal panel substrate and the transparent substrate;
the liquid crystal panel substrate comprising:
reflective electrodes formed in a matrix on a substrate;
transistors respectively formed below and in correspondence with the reflective electrodes, each of the transistors having a source electrode and a drain electrode, the transistors for applying a voltage to the reflective electrodes;
an intermediate conductive layer formed between the reflective electrodes and one of the source electrode and the drain electrode of the transistors; and
storage capacitors for storing charge respectively electrically connected to the reflective electrodes, each of the storage capacitors comprising an insulation film formed between the reflective electrodes and the intermediate conductive layer arranged below the reflective electrodes a predetermined potential being applied to the intermediate conductive layer, wherein each of the reflective electrodes is electrically connected to one of the source and drain electrodes of a corresponding transistor through a connector comprising a same layer as the intermediate conductive layer and is electrically isolated from the intermediate conductive layer.

21. A liquid crystal panel substrate comprising:
reflective electrodes formed in a matrix on a substrate;
transistors respectively formed below and in correspondence with the reflective electrodes for applying a voltage to the reflective electrodes, each of the transistors having a source electrode and a drain electrode;
an intermediate conductive layer formed between the reflective electrodes and one of the source electrode and the drain electrode of the transistors; and
storage capacitors for storing charge respectively electrically connected to the reflective electrodes, each of the storage capacitors comprising an insulation film formed between the reflective electrodes and the intermediate conductive layer arranged below the reflective electrodes, a predetermined potential being applied to the intermediate conductive layer, and a second storage capacitor connected in parallel with a storage capacitor being formed below the reflective electrodes in a different region from the transistors.

* * * * *